United States Patent [19]
Moslehi et al.

[11] Patent Number: 5,317,656
[45] Date of Patent: May 31, 1994

[54] FIBER OPTIC NETWORK FOR MULTI-POINT EMISSIVITY-COMPENSATED SEMICONDUCTOR WAFER PYROMETRY

[75] Inventors: Mehrdad M. Moslehi; Habib N. Najm, both of Dallas, Tex.

[73] Assignee: Texas Instruments Incorporated, Dallas, Tex.

[21] Appl. No.: 17,359

[22] Filed: Feb. 11, 1993

Related U.S. Application Data

[63] Continuation of Ser. No. 702,798, May 17, 1991, abandoned.

[51] Int. Cl.$^5$ .............................................. G02B 6/02
[52] U.S. Cl. ...................... 385/12; 385/115; 385/117; 385/147
[58] Field of Search ............ 385/12, 88, 115, 116, 385/117, 147

[56] References Cited

U.S. PATENT DOCUMENTS

| | | | |
|---|---|---|---|
| 4,367,040 | 1/1983 | Goto | 385/12 |
| 4,417,822 | 11/1983 | Stein et al. | 374/129 |
| 4,525,818 | 6/1985 | Cielo et al. | 385/13 |
| 4,799,756 | 1/1989 | Hirschfield | 385/12 |
| 4,808,815 | 2/1989 | Langley | 385/12 |
| 4,906,106 | 3/1990 | Kaufmann et al. | 385/12 |
| 5,101,453 | 3/1992 | Rumbaugh | 385/12 |

*Primary Examiner*—Frank Gonzalez
*Attorney, Agent, or Firm*—Wade James Brady; Richard L. Donaldson

[57] ABSTRACT

A fiber-optic network for communicating non-invasive, real-time, in-situ semiconductor wafer radiance and emissivity measurements. The fiber-optic network includes a plurality of optical fibers, a plurality of fiber-optic bundles, and a chopper multiplexer. The fiber-optic bundle provides for the simultaneous transmission and receipt of coherent infrared light energy and radiant heat energy from a semiconductor wafer within a fabrication reactor. The fiber-optic bundles are designed to be sufficiently small to fit within hollow light pipe in a lamp module that directs optical heating energy to the wafer. This substantially eliminates measurement error that the lamp module generates in known measurement devices. Use of optical fibers for transmitting and receiving laser energy and wafer radiance permits precision placement of the fiber-optic bundles to measure multiple temperatures on the semiconductor wafer surface.

33 Claims, 11 Drawing Sheets

FIBER OPTIC NETWORK FOR MULTI-POINT EMISSIVITY-COMPENSATED SEMICONDUCTOR WAFER PYROMETRY

Notice

The U.S. Government has a paid-up license in this invention and the right in limited circumstances to require the patent owner to license others on reasonable terms as provided for by the terms of the contact between assignee and the United States Air Force under the program name MMST.

This application is a continuation of application Ser. No. 07/702,798, filed May 17, 1991 (now abandoned).

TECHNICAL FIELD OF THE INVENTION

The present invention generally relates to measurement of semiconductor wafer physical characteristics, and more particularly to a fiber-optic network for multi-point, non-invasive, in-situ, semiconductor wafer pyrometry with real-time emissivity compensation.

BACKGROUND OF THE INVENTION

Integrated circuit chip manufacturers fabricate semiconductor devices by different combinations of processes. One widely used processing technique is chemical-vapor deposition (CVD) which is employed to form various material layers (metals, dielectrics, semiconductors) on the surface of semiconductor wafers. The material layers which manufacturers apply and etch may comprise various dielectric or insulating layers in addition to one or more of the following conductive layers: a thin metal coating such as tungsten, aluminum, copper, or gold; a thin polysilicon coating doped with conductive impurities; or other layers of metal silicides and metal nitrides. Process control and manufacturing tolerances apply to the sequential device fabrication processes. Deviations from specified target tolerances in excess of only a few percentage points during various device fabrication processes may result in defective and rejected semiconductor chips.

In thermal processing equipment such as in a single-wafer rapid thermal processing (RTP) reactor, one of the critical process parameters is the wafer temperature. Therefore, it is important to measure the wafer temperature and its distribution uniformity in real-time by a non-invasive temperature sensing device. Repeatable, precise, and process-independent measurements of the wafer temperature are among the most important requirements of semiconductor processing equipment (such as RTP) in integrated circuit manufacturing.

FIG. 1 shows an RTP reactor 20 containing a semiconductor wafer 22 and in which a typical non-contact temperature measuring pyrometer 24 detects radiance or black-body radiation emitted from the heated wafer. RTP reactor 20 has a process environment bounded by quartz (or metallic) process chamber (consisting of transparent walls 32, 36) contained within casing with a lower wall 28 and upper wall 40. Within RTP reactor 20 wafer 22 is heated on both sides by two banks of linear heating lamps (tungsten-halogen lamps) 30 and 38 through optical windows 32 and 36. The RTP system may employ only one bank of tungsten-halogen lamps for one-sided wafer heating. Thermocouple 34 may be used to provide wafer temperature measurement for calibration of the pyrometry readings. Since thermocouple requires wafer contact, it is not used during actual device processing.

Optical pyrometry has been used as a non-invasive method for wafer temperature measurement in the known RTP systems. However, the accuracy and reproducibility of conventional pyrometry are very sensitive to the wafer bulk and surface optical properties (or emissivity), interference due to the heating lamps, process environment, and the type of process being performed in the reactor. With the double-sided lamp heating arrangement, the pyrometer will usually experience direct radiation exposure from the lamps regardless of the positioning of the pyrometer. However, the disturbance of the pyrometer reading will be minimal if the spectral distribution of the heating lamps has no overlap with the pyrometer's operating spectral band or wavelength.

With the single-sided lamp heating (example shown with a single arc lamp) arrangement of FIG. 2 shown with a metallic process chamber, a hole 53 can be formed through a side of the RTP vacuum chamber 50 opposite the heat lamp 66 in order to insert an optical window (the single-sided RTP system 50 may use one bank of tungsten-halogen lamps instead of a single high-power arc lamp). Pyrometer 52 is placed near the hole 53 to detect a portion of the emitted black-body radiation 54 from wafer 22. This arrangement may be somewhat more suitable than the above-mentioned double heat lamp arrangement since it is free (not completely) from direct viewing of the lamp and its interference effects. However, silicon wafer 22 may remain at least partially transparent to the lamp radiation in the infrared region (e.g., beyond 1.5 $\mu$m) at lower wafer temperatures (e.g., below 600° C.), so pyrometer 52 may still be affected by lamp radiation passed through a partially transparent wafer 22.

Conventional pyrometry techniques also assume a semiconductor wafer has a known fixed emissivity. In actuality, emissivity can change from semiconductor wafer to semiconductor wafer. Emissivity values depend on various layers of materials present on the semiconductor wafer, substrate background doping, semiconductor wafer backside surface roughness, and semiconductor wafer temperature. The presence of device patterns on the semiconductor wafer and the pyrometry wavelength may also affect spectral emissivity. In practice, while the amount of error that using an erroneous value for wafer emissivity can produce is usually uncertain, it has been shown to cause wafer temperature measurement errors up to 10's or even 100's of °C.

FIG. 3 is a graph of silicon wafer emissivity as a function of wavelength. For different wafer temperatures [in °K], FIG. 3 shows measured emissivity for a 1.77 mm thick silicon wafer with a relatively low level of n-type doping. The substrate is a comparatively pure sample having a resistivity of 1.4 $\Omega$-cm. All measurements in FIG. 3 were made at a vacuum of $10^{-4}$ mm Hg. The plot of FIG. 3 shows measurements of spectral emissivity for silicon from 0.4 to 15.0 $\mu$m at temperatures ranging from 543° K. to 1070° K. Thermal radiation of silicon is due to band-to-band transitions, free carriers and lattice vibrations. This radiation lies primarily in the visible and infrared regions of the spectrum. FIG. 3 shows that spectral emissivity changes significantly for pyrometry applications as a function of incident coherent beam wavelength. As temperature changes, emissivity will change. Thus, it is not possible to accurately measure temperature of the semiconductor wafer using pyrometry-based techniques, unless the pyrometry-based techniques compensate for changes in emissivity as a function of changes in temperature or surface optical conditions.

FIG. 4 illustrates the calculated relationship between the backside spectral 5.4 μm emissivity and polysilicon layer thickness for a semiconductor substrate with two backside films and a bare front side. For a 500 μm thick silicon substrate with a resistivity of 5 Ω-cm at 900° K. with two material layers on the backside, FIG. 4 shows the spectral backside emissivity vs. polysilicon film thickness for various oxide layer thicknesses. For example, with a 100 Å silicon dioxide first layer, the solid plot shows emissivity to be approximately 0.7 uniformly as polysilicon thickness increases from 0 to 1000 nm. With increased backside silicon dioxide layer thickness, emissivity will change significantly as a function of polysilicon layer thickness. In the extreme case shown, with a 5,000 Å backside silicon dioxide, FIG. 4 (graph 72) shows that emissivity can range from 1.0 to approximately 0.25 with widely varying values therebetween. These emissivity variations can cause significant temperature measurement errors in conventional pyrometry.

Thus, there is a need for an improved and reliable method and apparatus to precisely measure the temperature of a wafer in a semiconductor device fabrication reactor.

Thus, there is a need for a method and apparatus to provide real-time in-situ non-invasive temperature measurements of semiconductor wafers during device fabrication processes.

There is a need for an improved and reliable method and apparatus to precisely measure the temperature of a wafer in a single wafer RTP reactor.

In particular, there is a need for a pyrometry-based system that compensates for variations in semiconductor wafer emissivity during semiconductor wafer processing. These limitations are addressed U.S. patent applications Ser. Nos. 07/702,646 issued May 17, 1991 entitled "Multi-Point Pyrometry with Real-Time Surface Emissivity Compensation" and Ser. No. 07/702,792 entitled "Multi-Point Semiconductor Wafer Fabrication Process Temperature Control System." Another limitation associated with conventional pyrometry, however, is that these techniques are susceptible to interference from heating lamp irradiation. When performing pyrometry, ideally it would be desirable only to sense the emitted radiance from the wafer. In many cases, however, lamp radiation energy actually enters the detector contributes to the radiant energy reading. Because at least a fraction of the radiant component of the lamp output is within the pass-band of most pyrometers the resulting interference from the lamp contributes to the sensed radiant heat energy from the wafer. This results in inaccurate temperature measurements.

Yet another limitation associated with conventional pyrometry-based temperature sensing methods and apparatuses is an inability to provide high lateral or spatial resolution across the semiconductor wafer. Depending on the design of the pyrometer, conventional pyrometry-based techniques measure an area on the semiconductor wafer that ranges in diameter from one-half to several inches. This size of area on a semiconductor may include many semiconductor devices and essentially result in only average or regional temperature measurements with significant overlap among the regions and poor spatial resolution. Because of the poor spatial resolution of conventional pyrometry-based techniques, it is not possible to use known systems for precise temperature and uniformity control of multiple points on a semiconductor wafer during a fabrication process.

There is a need for a pyrometry-based temperature measurement method and apparatus that is less susceptible to lamp heating source radiative interference than previous devices.

There is a need for a pyrometry-based temperature measurement device for semiconductor wafers that provides multi-point high-resolution sensing of semiconductor wafers.

Yet another limitation of known pyrometry-based sensing systems is their susceptibility to heat radiation effects from the optical window that separates the pyrometry-based sensor from the semiconductor wafer. The window is an integral part of the processing reactor and it gradually heats as a result of absorbing radiant heat energy from the heated wafer and the lamp. The window heating affects the pyrometry reading accuracy. Therefore, not only is the lamp radiation itself a source of noise, but also optical window heating degrades pyrometry-based temperature readings.

Thus, there is a need for a pyrometry-based temperature sensor that not only is less susceptible to lamp radiation heating affects, but also is less severely affected by heating of the optical window in the processing reactor.

SUMMARY OF THE INVENTION

The present invention accordingly provides an apparatus and method for a fiber-optic network for multi-point, real-time non-invasive, emissivity-compensated in-situ semiconductor wafer pyrometry temperature measurements with real-time emissivity compensation that substantially eliminates and reduces disadvantages and limitations associated with prior semiconductor wafer temperature measurement methods, apparatuses, and systems.

According to one aspect of the invention, there is provided a fiber-optic network and sensing system for non-invasive, real-time, in-situ semiconductor wafer thermal energy and emissivity measurements. The fiber-optic network of the present invention includes fiber-optic bundles for the simultaneous transmission and receipt of coherent infrared light beams between a laser source and a semiconductor wafer and radiant heat energy from multiple points on the fabrication reactor.

The fiber-optic bundles include, within bundle jackets, optical fibers for transmitting coherent laser beams from a laser source to the wafer, and optical fibers for receiving reflected coherent beams and radiant energy from the wafer. A collimating lens in each fiber-optic bundle focuses the reflected coherent beam and radiant energy on the optical fibers configured to receive these signals. A separate set of optical fibers with fiber terminations may collect coherent beams that are transmitted through the semiconductor wafer. In a single multi-channel multiplexer, signals from all received signal optical fibers, all transmitted signal optical fibers, as well as two reference signals are combined to produce a time-division multiplexed output signal. The time-division multiplexed output signal carries information for semiconductor wafer temperature and emissivity measurements in a device fabrication process.

The fiber-optic bundles are designed to be sufficiently small to fit within a lamp module that directs optical heating energy to the wafer. As a result, the fiber-optic bundles send and receives coherent beams and radiant energy along paths essentially perpendicular to the semiconductor wafer surface.

This substantially eliminates temperature measurement error that the lamp module generates in known measurement devices. The fiber-optic bundles and fiber terminations provide an optical signal flow path that does not adversely affect semiconductor wafer processing, but that permits multi-point, non-invasive, in-situ, temperature measurements with real-time emissivity compensation. A technical advantage of the present invention is that use of optical fibers for transmitting and receiving laser energy permits precision placement of the fiber-optic bundles to measure small areas on the semiconductor wafer. Also, the space in the process chamber is severely limited. Using fiber-optics, however, permits having the necessary laser source and detector remote from the wafer in the fabrication reactor. This conserves valuable process chamber space and allows easy implementation and use of the multi-point temperature sensor.

A further technical advantage of the present invention is that it allows multi-point temperature sensing with good spatial resolution to allow real-time wafer temperature measurement and its distribution uniformity.

Yet another technical advantage of the present invention is that it provides a method and system that can be useful to precisely control wafer temperature and process uniformity during a semiconductor device fabrication process.

BRIEF DESCRIPTION OF THE DRAWINGS

The invention and its modes of use and advantages are best understood by reference to the following description of illustrative embodiments when read in conjunction with the accompanying drawings, wherein:

FIGS. 12a through 12f are various embodiments of fiber-optic bundles usable with the present invention;

DETAILED DESCRIPTION OF THE INVENTION

The preferred embodiment of the present invention is best understood by referring to the FIGUREs wherein like numerals are used for like and corresponding parts of the various drawings.

U.S. patent application Ser. No. 07/702,646, filed May 17, 1991 by Dr. Mehrdad M. Moslehi and Dr. Habib Najm entitled "Multi-Point Pyrometry with Real-Time Emissivity Compensation," now U.S. Pat. No. 5,156,461 issued Oct. 20, 1992 describes a method and apparatus that utilizes a fiber-optic network for multi-point, non-invasive, in-situ, pyrometry-based semiconductor wafer temperature measurements with real-time emissivity compensation U.S. patent application Ser. No. 07/702,792, filed May 17, 1991 by Dr. Mehrdad M. Moslehi and Dr. Habib Najm entitled "Multi-Point Semiconductor Wafer Fabrication Process Temperature Control System", now abandoned describes a method and system that integrates a sensor for multi-point, non-invasive, in-situ, pyrometry-based semiconductor wafer temperature measurements with real-time emissivity compensation and a surface roughness sensor described more particularly in U.S. patent application Ser. No. 07/638,472, filed Dec. 31, 1990 by Moslehi and entitled "Sensor for Semiconductor Device Manufacturing Process Control" and now U.S. Pat. No. 5,293,216 issued Mar. 8, 1994. The above referenced patent applications are incorporated herein in their entirety.

Figure 1:
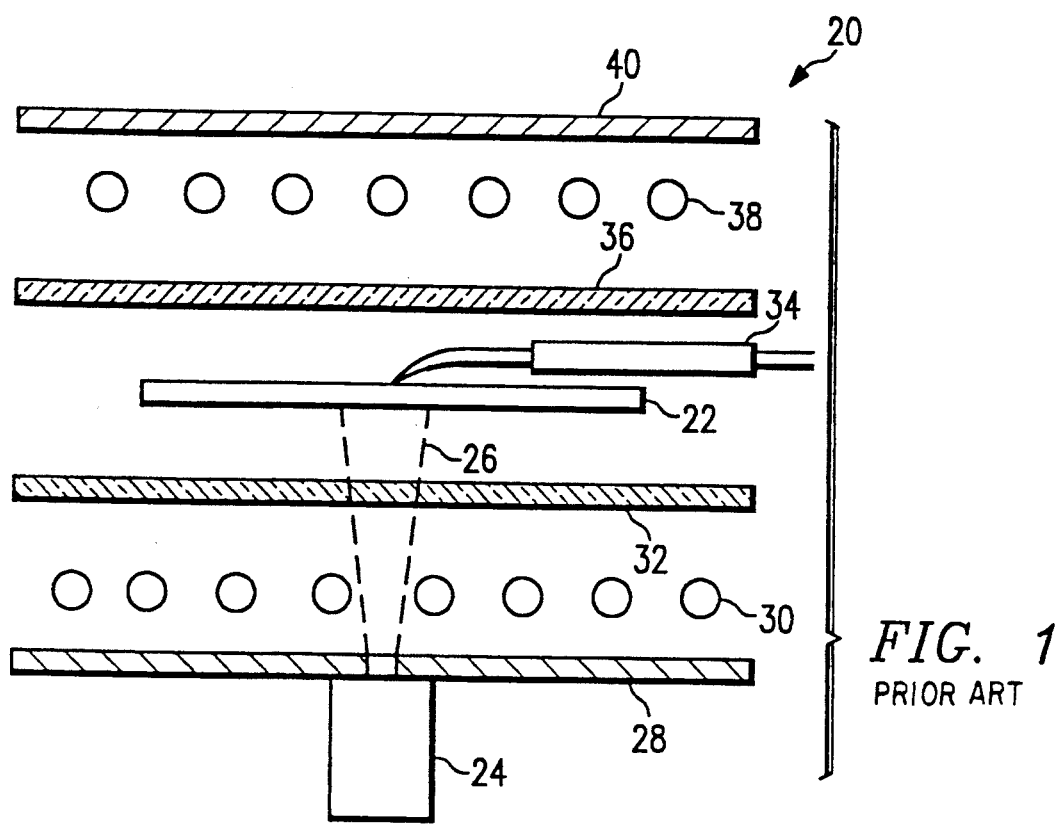
FIGS. 1 and 2 are examples of a prior art pyrometry devices used for semiconductor wafer temperature measurements in rapid thermal processing equipment.
Figure 2:
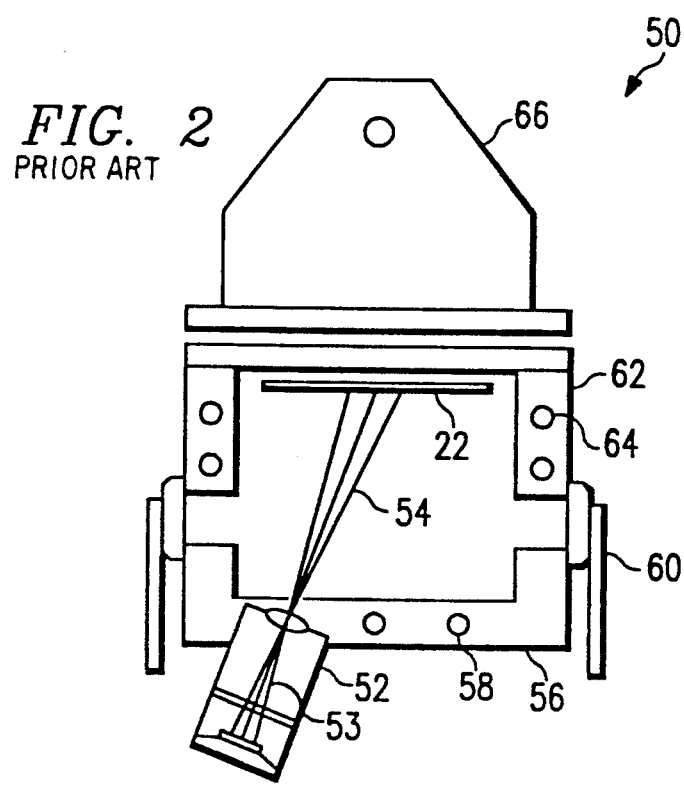
Figure 3:
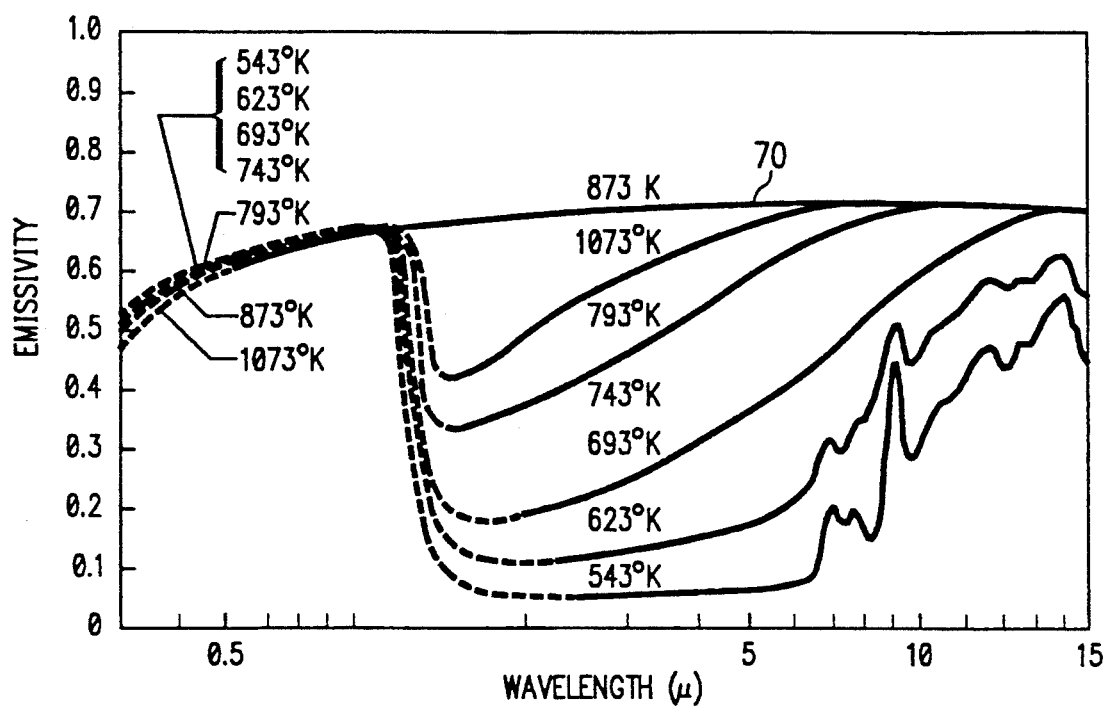
FIG. 3 is a graph of silicon wafer emissivity as a function of wavelength for various temperatures.
Figure 4:
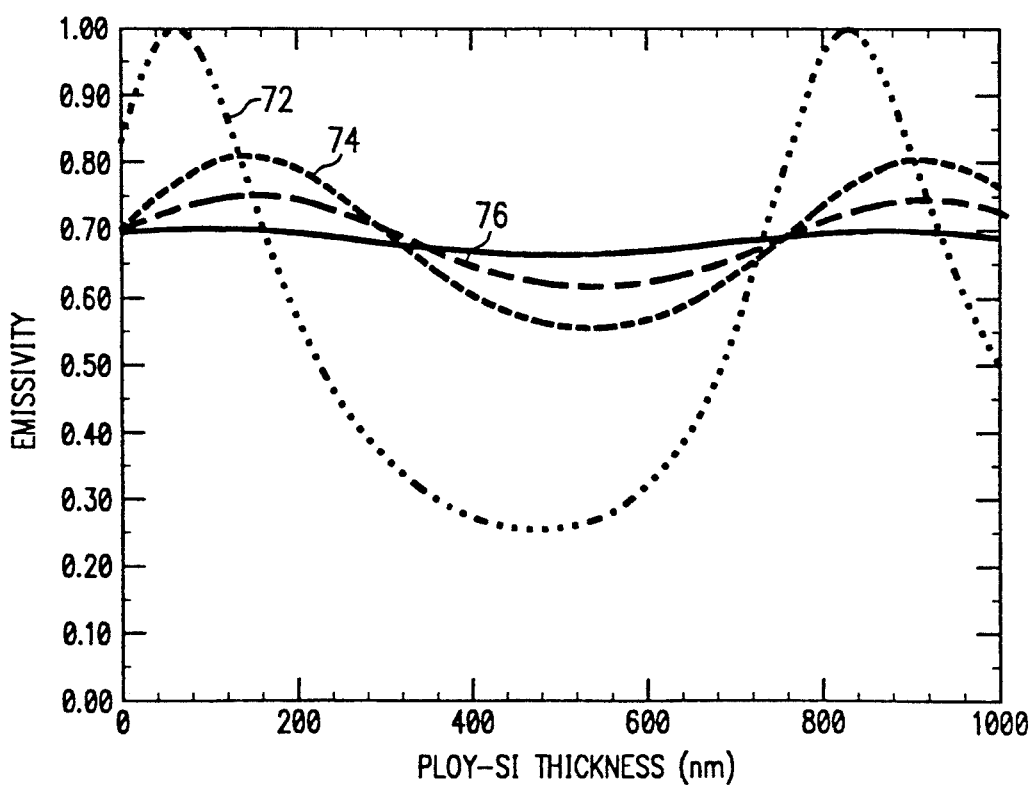
FIG. 4 is a graph of backside wafer emissivity at a 5.4 μm as a function of backside polysilicon and oxide layer thicknesses.
Figure 5:
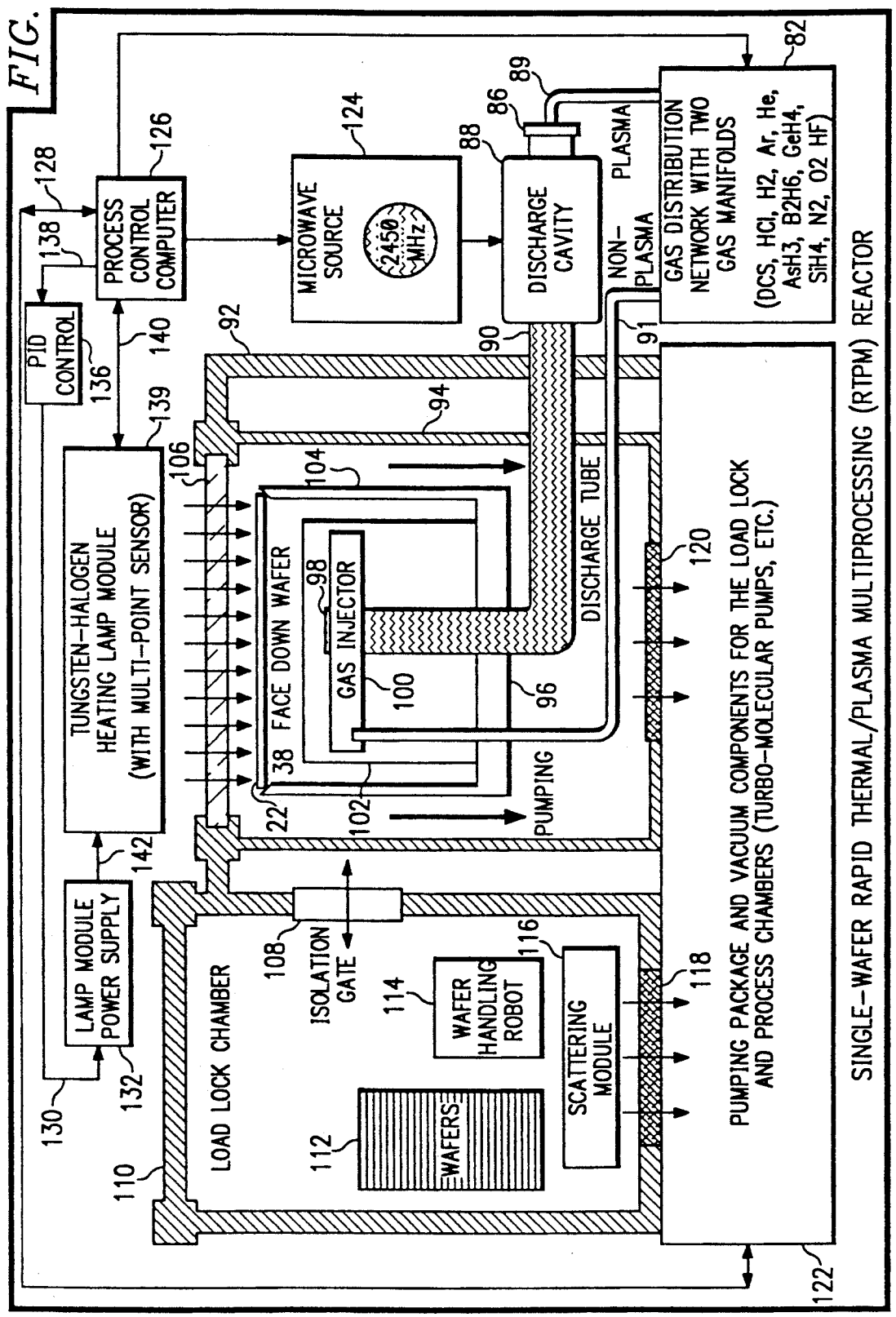
FIG. 5 is a schematic drawing of a single-wafer semiconductor device fabrication reactor using the present invention.

FIG. 5 is a schematic representation of a semiconductor fabrication reactor 80 establishing a representative single-wafer environment of the present invention. Within a single-wafer rapid thermal/plasma processing reactor such as the Texas Instruments' automated vacuum processor (AVP), may reside a semiconductor wafer 22 for device processing. Beginning the bottom right hand corner of FIG. 5, gas distribution network 82 may comprise two gas manifolds: a non-plasma process gas manifold (not shown) and a plasma manifold. Non-plasma process gas manifold connects to a gas line 91 which penetrates through reactor casing 92 and process chamber wall 94 to proceed through ground electrode 96 and into gas injector 100. Plasma manifold connects via gas line 89 into discharge cavity 88 for generating process plasma. Process plasma activated species pass within plasma discharge tube 90 through reactor casing 92 and process chamber wall 94, through ground electrode 96 and into wafer process environment. Above gas injector assembly 100 and supported by low thermal mass pins 109 appears semiconductor wafer 22. Low thermal mass pins 109 are supported by ground electrode 96 within process chamber 38. Process chamber 38 includes optical quartz window 106 which separates semiconductor wafer 22 from tungsten-halogen heating lamp module 139. In the preferred embodiment of the present invention, tungsten halogen heating lamp module 139 includes multi-point sensor of the present invention which subsequent FIGUREs and associated text describe.

Process chamber 38 also includes pump down interface 120 which removes process gas and plasma into pumping package 122. Additionally, isolation gate 108 permits passage of semiconductor wafers 22 from the load-lock chamber 110 into process chamber 38. To permit movement of semiconductor wafers 22 into process chamber 38, process chamber wall 94 is supported by vertically moving element (not shown). Within loadlock chamber 110 appear a stack of semiconductor wafers 112 from which wafer handling robot 114 removes a single semiconductor wafer 22 for processing. In the preferred embodiment of the present invention, loadlock chamber 110 may also include optical scattering module 116 described by aforementioned U.S. patent application Ser. No. 07/638,472, filed Dec. 31, 1990 by Moslehi and entitled "Sensor for Semiconductor Device Manufacturing Process Control". That U.S. Patent Application is hereby incorporated by reference herein in its entirety. Scattering module 116 is used, among other things, to determine the surface roughness of each semiconductor wafer 12 as it passes from wafer cassette 112 into process chamber 38.

To maintain load-lock chamber 110 and process chamber 38 under vacuum, load-lock chamber 110 also includes vacuum pump interface 118 which permits pumping package 122 to maintain vacuum. Process control computer 126 controls the fabrication of semiconductor wafer in the reactor of FIG. 5. Control signals from process control computer 126 include signals to PID temperature/lamp power controller 136. PID controller 136 provides various control signals to lamp module power supply 132. Lamp module power supply 132, in turn, provides various control signals to tungsten-halogen heating lamp module 139. Process control computer 126 also directs control vacuum setpoints to pumping package 122 and gas and plasma inlet flow signals to gas distribution network 82. To provide proper activation of plasma species at discharge cavity 88, process control computer 126 provides a control signal to microwave source 124 which, in the preferred embodiment, operates at a frequency of 2450 MHz.

To control the input power of tungsten-halogen heating lamp module 139, process control computer 126 sends power control signals via line 138 to PID controller 136 in response to the temperature sensor outputs (received via line 140). Sensing lines 140 to process control computer 126 from tungsten-halogen heating lamp module 139 include signals from multi-point temperature sensor of the present invention which measure the temperature of semiconductor wafer 22 in real time.

Figure 6:
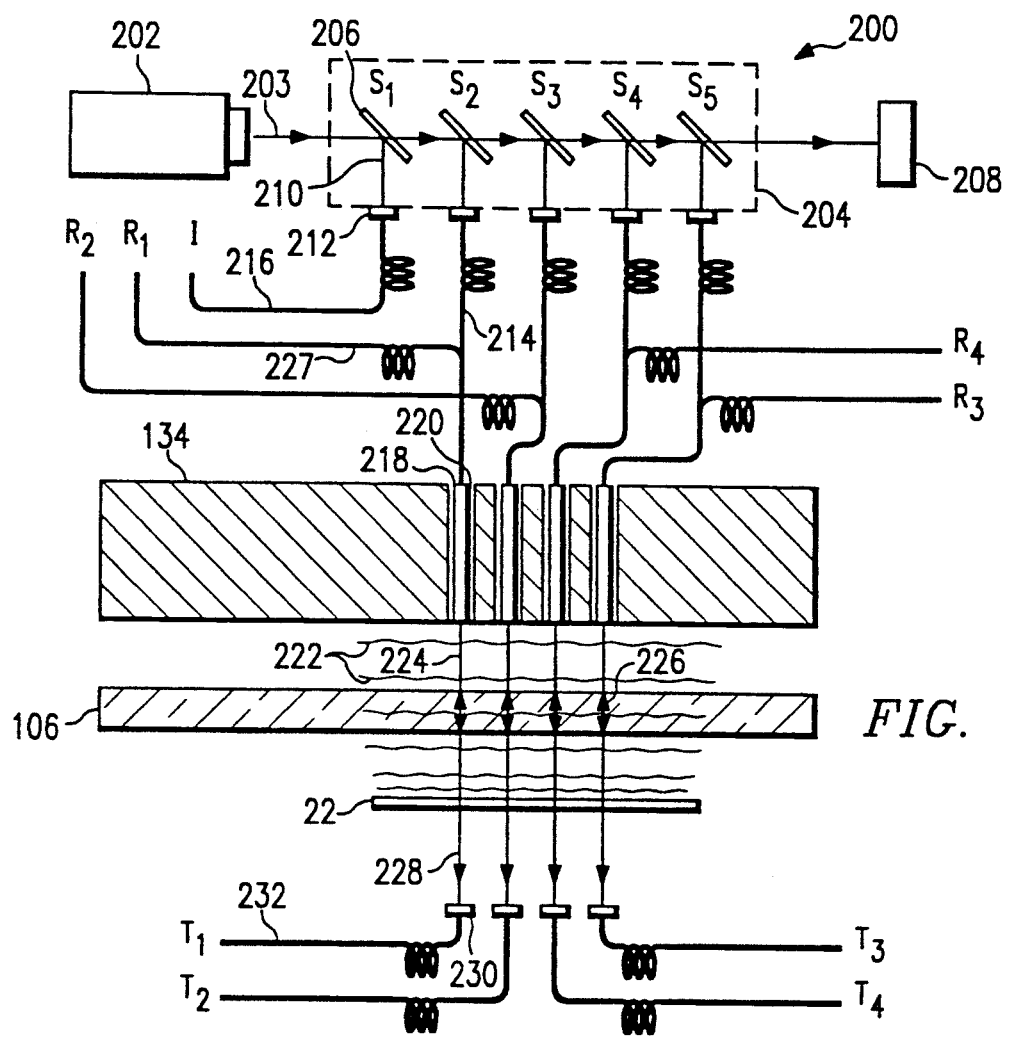
FIG. 6 is a schematic drawing illustrating a preferred embodiment of the present invention.

FIG. 6 is a schematic drawing illustrating a preferred embodiment of temperature sensor of the present invention. In the discussions that follow, the detailed description refers to only one path for signal flow. In fact, the present invention may use numerous channels, and the preferred embodiment has four paths for signal flow for four-point temperature measurements. Infrared CO laser 202 provides a coherent incident beam 203 to beam splitter module 204. Beam splitter module 204 contains beam splitters S1 through S5 in the preferred embodiment which split coherent incident beam 203 into five coherent beams with essentially equal intensities. For example, coherent beam 210 has equal intensity to all other beams split by beam splitter module 204. Infrared fiber connector 212 receives coherent beam 210 and sends it into fiber 216. Remaining infrared laser energy from beam splitter S5 exits beam splitter module 204 and is absorbed by absorber 208. From infrared fiber connector 212 coherent beam 210 travels through optical fiber 216. Optical fiber 216 is used to measure an incident coherent beam power level I. Optical fiber 214, however, leads directly to fiber bundle 218. Other types of beam splitters may be used instead of the design shown in FIG. 6.

Fiber-optic bundle 218 fits within bore 220 of lamp module 134. From fiber-optic bundle 218 incident coherent beam 224 is emitted through optical window 106. After traveling through optical window 106, incident coherent beam 224 is incident upon semiconductor wafer 22. A portion of incident coherent beam 224 is reflected to become reflected coherent beam 226. A portion of incident coherent beam 224 is transmitted through wafer 22 to become transmitted coherent beams 228. Fiber-optic termination 230 receives transmitted coherent beam 228 which travels through optical fiber 232 to become transmitted beam outputs T1.

The portion of incident coherent beam 224 that semiconductor wafer 22 reflects is returned to fiber-optic bundles 218. Additionally, because of the elevated temperature to which lamp module 134 takes semiconductor wafer 22, semiconductor wafer 22 also emits incoherent radiant energy 222. Fiber-optic bundle 218 receives reflected coherent beams and incoherent radiant energy and directs these signals to optical fibers 227 to become received signals R1.

Sensor 200 of the present invention provides multi-point temperature sensing of semiconductor wafer 22 with a real-time emissivity measurement. The real-time emissivity measurements are used for real-time emissivity compensation and extraction of true wafer temperature. Infrared laser 202, in the preferred embodiment, comprises a CO laser, however other forms of optical energy may be used to achieve the purposes of the present invention. Lamp module 134 comprises an array of tungsten-halogen lamps used to heat the face-down semiconductor wafer 22. Lamp module 134 has a plurality of hollow light pipes designed to receive fiber-optic bundles 218. The typical diameter of bore 220 ranges from $\frac{1}{8}$" to $\frac{1}{4}$", other diameters may be used, depending on the desired dimension of each of the fiber-optic bundles 218 and other characteristics associated with lamp module 134 and semiconductor wafer 22.

Optical vacuum window 106 separates lamp module 134 and fiber-optic bundles from semiconductor wafer 22. Additionally, optical window 106 not only serves to transfer wafer heating flux and coherent laser energy between wafer 22 and fiber-optic bundles 218, but also maintains a controlled process environment or vacuum within the process chamber for processing semiconductor wafer 22. Optical window 106 is optically transparent for both the lamp energy from lamp module 134 and incident coherent laser beam 224 and reflected coherent beam 226. Optical transparency is a function of the window material and the wavelength of the optical energy passing through optical window 106 so the material for window 106 is selected with optical transparency in the desired band as an essential criterion. For example, for 5.4 μm laser power transmission, a window material such as sapphire or calcium fluoride may be required. Smaller 5.4 μm transparent windows (e.g., sapphire) may be property attached or sealed to a larger quartz window base plate.

As a further example, the points at which fiber-optic bundle 218 and other similar bundles transmit coherent laser beams through optical window 106 can employ smaller view ports made of a material such as sapphire, calcium fluoride, zinc selenide, barium fluoride, or some other suitable IR-transparent material. This may be desirable, because optical transmission of thick (e.g., 0.5") quartz does not exceed 3.5 μm, whereas the wavelength of the coherent infrared energy emitted from fiber-optic bundle 218 may be approximately 5.4 μm, as in the preferred embodiment. Replacing sensor portions of optical vacuum quartz window 106 that directly receive the output from fiber-optic bundle 218 and additional similar bundles with a material transparent to infrared radiation assures that the infrared energy from fiber-optic bundle 218 can transmit through optical window 106 and interact with semiconductor wafer 77.

Fiber-optic bundle 218 is positioned within lamp module 134 in order to minimize the direct lamp irradiation received by the bundle from the lamp module 134. As a result, the only signals that fiber-optic bundle 218 receives from lamp module 134 are indirect reflected signals. Moreover, fiber-optic bundle 218 is designed to preferably transmit the 5.4 μm wavelength energy from laser 82. At a wavelength of 5.4 μm, there is negligible signal interference due to the heating lamps. This is due to the fact that the quartz jackets of tungsten-halogen lamps cut off optical radiation beyond 3.5–4 μm.

Although it is possible to operate infrared laser source 202 with a constant output, in the preferred embodiment a chopped or modulated output is used. Process control computer 126 controls chopping action and frequency of infrared laser 202 to produce a low-frequency chopping of 5.4 μm wavelength coherent beam 203 into beam splitter module 204 in the preferred embodiment. The laser chopping frequency is chosen to be much larger than the rate of real-time emissivity and temperature measurements. The chopping frequently may be in the range of 100 Hz to 10 KHz. Beam splitter module 204 divides the output of chopped infrared laser 202 into n+1 channels, where n is the number of sensor points for transmission and receipt of laser signals. The number of laser beam outputs from beam splitter module 204 equals the number of points at which semiconductor wafer 22 is to be measured or, equivalently, the number of fiber-optic bundles 218, plus a reference output I. In the preferred embodiment, n=4, so beam splitter module 204 splits output beam from laser 202 into 5 output beams having essentially equal output power or intensity levels.

Infrared laser 202 is a stable laser of known stable polarization and without mode hopping to provide a steady and known coherent infrared beam output. Depending on the number of output beams from beam splitter module 204, the split factor of beam splitters S1 through S5 may be determined. Thus, for example, if four sensing beams are to be split from the output of infrared laser 202, beam splitters 1 through 5 would provide an equal division in five levels to produce a reference signal I, and four beam outputs into fiber-optic bundles, such as fiber-optic bundle 218. The output laser beams may also have different intensities as long as the intensity ratios are known and remain constant.

Although the configuration of FIG. 6 illustrates sensing of four different points on semiconductor wafer 22, the application of the present invention can be extended to an arbitrarily large number, n, of probed points on the semiconductor wafer 12. For each number of points, n, beam splitter 204 would split the beam from infrared laser 202 into n+1 beams. The optimum number and positions of the sensing points depend on various factors including the heat source design (e.g., number of lamp heating zones) and wafer size.

Fiber-optic bundle 218, in addition to collecting reflected coherent beams from semiconductor wafer 22, collects incoherent radiant energy emitted from semiconductor wafer 22. Fiber-optic bundle 218, therefore, receives a 5 KHz chopped reflected coherent beam 226 and a DC (or low frequency) radiant infrared energy emitted by wafer 22. As a result of chopping the incident coherent beam 224 from infrared laser 202, it is possible to identify and separate the AC component of the collected signal corresponding to the reflected coherent beam from semiconductor wafer 22 from the total signal that fiber-optic bundle 218 collects. This produces an AC signal component and a DC (or background low frequency) signal component of the collected signal that fiber-optic bundle 218 collects.

For low-temperature measurement applications, the preferred embodiment also uses transmitted fiber termination 230 to receive that portion of incident coherent beam 224 that transmits through semiconductor wafer 22. In high temperature measurements (typically at least 600° C.) the semiconductor wafer appears opaque to incident coherent beam 224. This is also true when the semiconductor substrate is heavily doped (P+ or N+). As a result, transmitted coherent beam 228 is insignificant for high temperature applications (e.g., temperature higher than 600° C.). Additionally, if semiconductor wafer 22 contains significant amounts of doping in the substrate, the wafer will appear opaque to incident coherent beam 224 even at lower temperatures. In low-temperature processing applications, however, incident coherent beam 224 transmission through semiconductor wafer 22 may be significant. In such cases, transmitted coherent beam 228 must be measured for precise real-time emissivity measurements.

For each transmitted coherent laser beam 228 that passes through semiconductor wafer 22, fiber termination 230 receives the beam and transmits it through infrared fiber cable 232 to the remainder of the sensor of the present invention.

Figure 7:
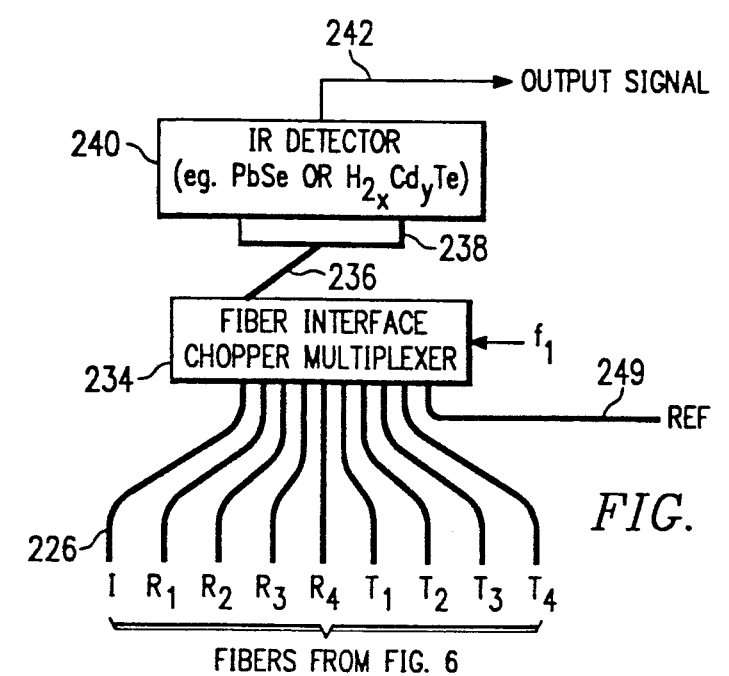
FIG. 7 is a cross-sectional view of a time-division chopper multiplexer with optical fiber interface used in a preferred embodiment of the present invention.

FIG. 7 is a cross-sectional view of a time-division chopper multiplexer with infrared fiber interface used in a preferred embodiment of the present invention. The signals I, R1 through R4, and T1 through T4 from each optical fiber, such as optical fiber 226, are received by fiber interface chopper multiplexer 234. Fiber interface chopper multiplexer 234 provides a time-division multiplexed optional signal 236 that associates with each of the fiber-optic cable input signals I, R1 through R4, and T1 through T4. Infrared detector 240 receives these signals through detector window 238. Infrared detector 240 provides a time-division multiplexed electrical output signal 242 to other portions of the closed-loop temperature controller on the fabrication reactor 80.

The preferred embodiment includes one cable 249 having a reference optical signal, one cable having an incident beam signal, I, four cables having reflected beam and collected radiance signals, R1 through R4, and four cables having transmitted beam signals T1 through T4. Detector 240, in response to the power of the optical signal it receives, produces a current or voltage signal which is proportional to the signal power in the respective optical channel.

Reference input channel 249 comprises the output of a semiconductor diode laser 446 (see FIG. 15) having frequency and/or amplitude values differing from those of I, $R_1$ through $R_4$, and $T_1$ through $T_4$, but still within the response range of detector 240. This allows process control computer 126 to identify the beginning of each cycle of chopper wheel 244 for the purpose of synchronous operation. For example, output from semiconductor diode laser 446 for the reference signal 249 may have a chopping frequency of 10 KHz. With this fundamentally different chopping frequency, it would be clear to a process control computer 126 that upon receiving signals from reference channel 249, a new cycle has begun (assuming that the infrared laser source 202 is chopped at a different frequency (e.g., 5 KHz). Other methods of synchronization are also possible.

Detector 240 includes a filter to block all but a prespecified bandwidth around the spectral band associated with laser 202 wavelength of 5.4 $\mu$m, in the preferred embodiment. The bandwidth of optical filter, in the preferred embodiment, may be 0.1 to 0.5 $\mu$m. It is important to center the bandwidth of the optical filter at the wavelength of infrared laser 202.

It is possible to connect independent sensors to each of the fiber-optic cables that includes a transmitted or reflected signal from semiconductor wafer 22. It is also necessary to use a high-performance fast infrared sensor to measure the level of wafer radiance and infrared reflectance and transmittance for the semiconductor wafer at each probed point. To use multiple independent sensors for signal measurement, therefore, would not only be rather expensive for the purposes of the present invention, but also would unnecessarily create numerous calibration requirements in relating the results of multiple detectors. However, multiple infrared detectors may be used instead of time-division multiplexing with a single detector, if desired.

To overcome this problem, the present invention associates optical fibers containing signals I, $R_1$ through $R_4$, and $T_1$ through $T_4$, for example, with a single high-performance infrared detector. As a result, it is not necessary to check multiple detectors for signal drift and calibration. Calibration of a single detector will maintain consistency among properly operating fiber-optic channels for multi-point wafer emissivity and temperature measurements.

In the preferred embodiment of the present invention, infrared detector 240 is a low-noise lead selenide (PbSe) or a mercury cadmium telluride (HgCdTe) detector unit that operates in the range of 77° to 200° K. (liquid nitrogen or thermoelectric-cooled). Other suitable high-performance low-noise sensors may also be used. Detector window 238 is a thin plate of sapphire or calcium fluoride having an area of between 2 and 5 $mm^2$ and is transparent to the infrared laser and reference laser beam. It is desirable to place the output of each fiber-optic channel as close as possible to the detector window 238.

Figure 8:
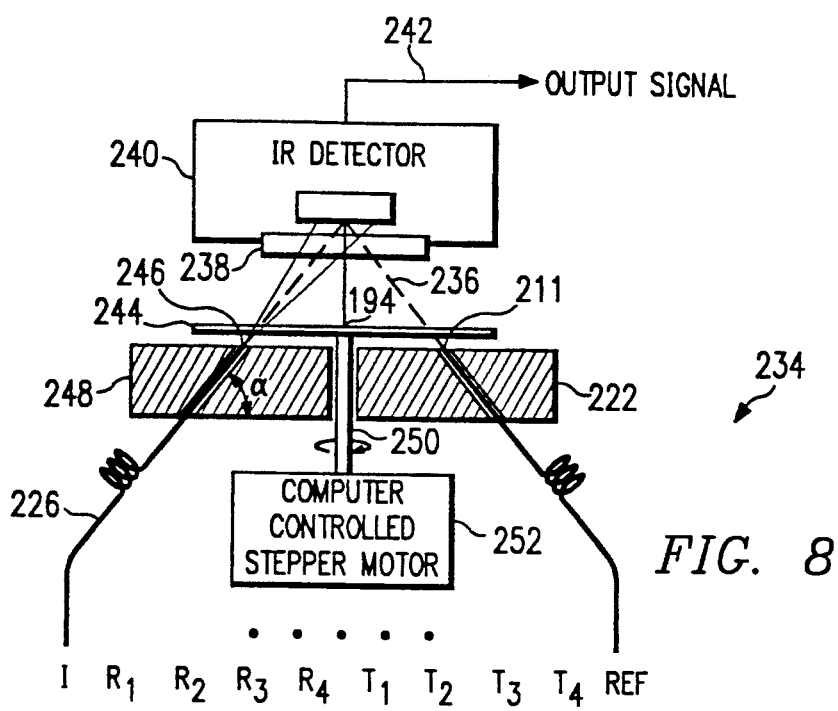
FIG. 8 is a schematic cross-sectional side view of a time-division chopper multiplexer with fiber interface used in a preferred embodiment of the present invention.

FIG. 8 is a cross-sectional side schematic view of the time-division chopper multiplexer with fiber interface illustrating the connection of fiber-optic cables in a fiber-optic adapter module of a preferred embodiment. According to FIG. 8, each of the fiber-optic cables containing signals I, $R_1$ through $R_4$, $T_1$ through $T_4$, and REF (reference) fits through a channel 246 of fiber adapter module 248. Chopper wheel 244 rotates at the frequency, f1, by being attached to shaft 250 which computer-controlled stepper motor 252 drives. The chopper wheel 244 permits time-division-multiplexed signals from fiber-optic cables 226 to reach detectors window 238. Detector element 239 converts infrared light signals from fiber-optic cables 226 into an electrical signal output that goes to the remainder of the sensor system 200 of the present invention.

Chopper wheel 244 scans each of the input optical channels at the frequency, f1. The frequency, f1, is chosen depending on the chopping frequency of infrared laser 202. For example, with a chopping frequency of approximately 5 KHz, the scanning frequency f1 may be between 5 and 50 Hz. Having f1 with a value of between 5 and 50 Hz in this instance ensures that the period of rotation of chopper wheel 244 is sufficiently large to assure many samples of each chopped input channel to reach detector 240 (e.g., 10-100 samples or more) for proper signal time averaging.

Fiber adapter module 248 and chopper wheel 244 produce a rotating scanning effect on each of the input optical channels: I, reference REF, R1 through R4, and T1 through T4.

Although there are numerous ways to configure chopper wheel 244 in multiplexer 234, in the preferred embodiment the fiber adapter module 248 places the input fiber-optic channels around the periphery with a shaft to support chopper wheel 244 at its center. Shaft 250 penetrates through fiber adapter module 248 through a collar 251 that permits free rotation of shaft 250. Shaft 250 connects to stepper motor 252 that rotates, causing shaft 250 and chopper wheel 244 to rotate. The frequency of stepper motor 252 rotation may be Controlled by process control computer 126.

In order to maintain proper coupling between fiber adapter module 248 and detector 240, fiber adapter module 248 is rigidly mounted to detector 240. Chopper wheel 244 rotates in the gap between the two firmly attached components.

The angle, $\alpha$, at which precision fiber channels of fiber adapter module 248 reside is a function of the size of adapter module 248 and the relative position of the entering fiber lines to fiber adapter module 248 and detector 240. Thus, as the number of input channels to fiber adapter module 248 increases, the angle $\alpha$ will decrease to accommodate the greater diameter of fiber adapter module 248. Additionally, it is important not to have too small an angle, $\alpha$, to prevent excessive beam divergence and spread over detector window 238 and degrade the signal collection from optical channels (246 through 211).

In the preferred embodiment of the present invention, the angle, $\alpha$, approximates 45°. The ends of fiber-optic channels 211 through 246 do not include collimating lenses, but are polished to help minimize divergence of the output laser signal. Because of the small distance between detector window 238 and optical channels 211 through 246, the absence of a collimating lens only minimally affects the collection of the signals from the channels. However, collimating or beam-shaping lenses may be used at the fiber ends.

Figure 9:
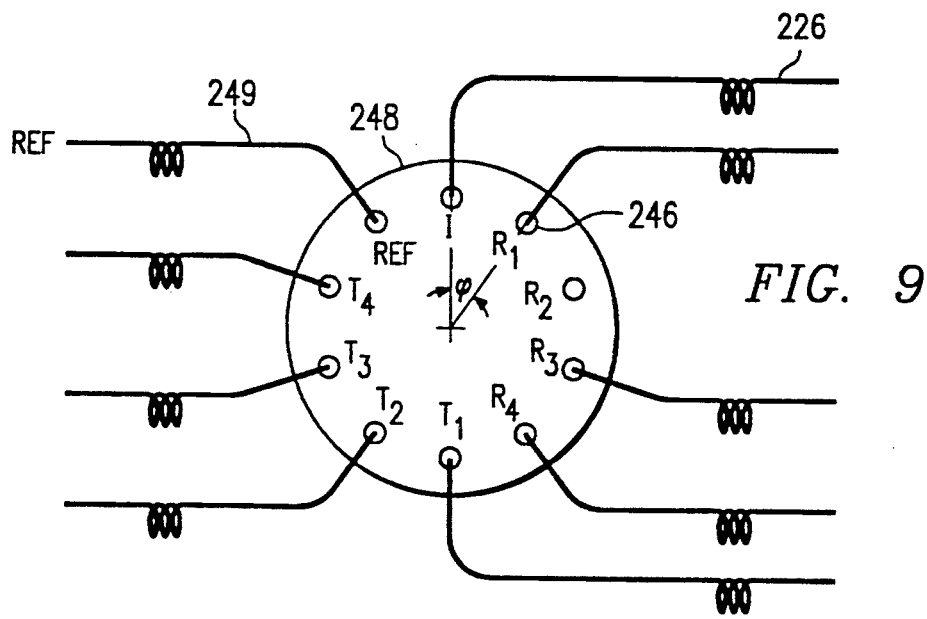
FIG. 9 is a top perspective view of the fiber adapter module of a preferred embodiment of the present invention.

FIG. 9 shows a top down schematic view of the adapter module 248. Outputs from the adapter module 248 are spaced an equal distance near the periphery of the adapter module 248 having an equal angle, $\theta$ between adjacent output points.

Figure 10:
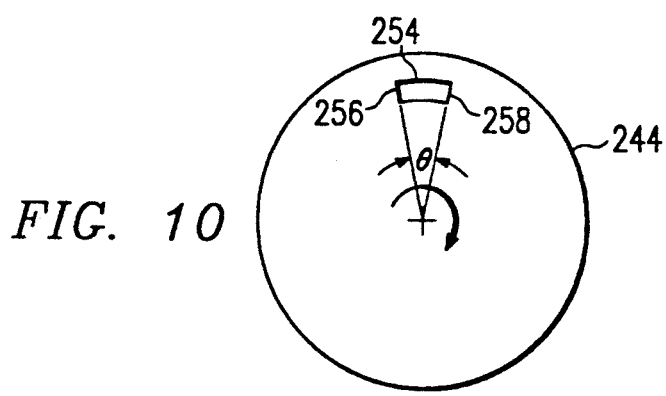
FIG. 10 is a top perspective view of the chopper wheel used in a preferred embodiment of the present invention.

FIG. 10 shows a top down perspective of chopper wheel 244. Chopper wheel 244 is opaque except for slot 254 which is an arched opening extending over an angle, $\theta$, from its center. Chopper wheel 244 rotates above output side 222 of adapter module 248 to permit only one channel I, R1 through R4, T1 through T4, or REF to transmit light signals to detector 240. Within chopper wheel 244 appears a slot 254 whose edges 256 and 258 form an angle from the center of chopper wheel 190, $\theta$, which is smaller than the angle created by the angle between adjacent fiber-optic channels for example, through the center of fiber adapter module 192, $\phi$. As chopper wheel 244 rotates from one input channel to the next, a brief period occurs when signal collection from fiber adapter module 248 is blocked. Although it is important to have this separation between adjacent signals, it is also important to minimize the difference between $\theta$ and $\phi$ so that the maximum amount of signal reception can occur at detector 240. It is desirable that chopper wheel 244 have as low a mass as possible so that it may be rapidly controlled to vary speed and operate at high speeds. To achieve these objectives, chopper wheel 244 has a thickness of approximately 1 mm and a diameter of 5 to 20 mm comprising a material that is opaque to infrared laser emissions (e.g. thin stainless steel disk).

Figure 11:
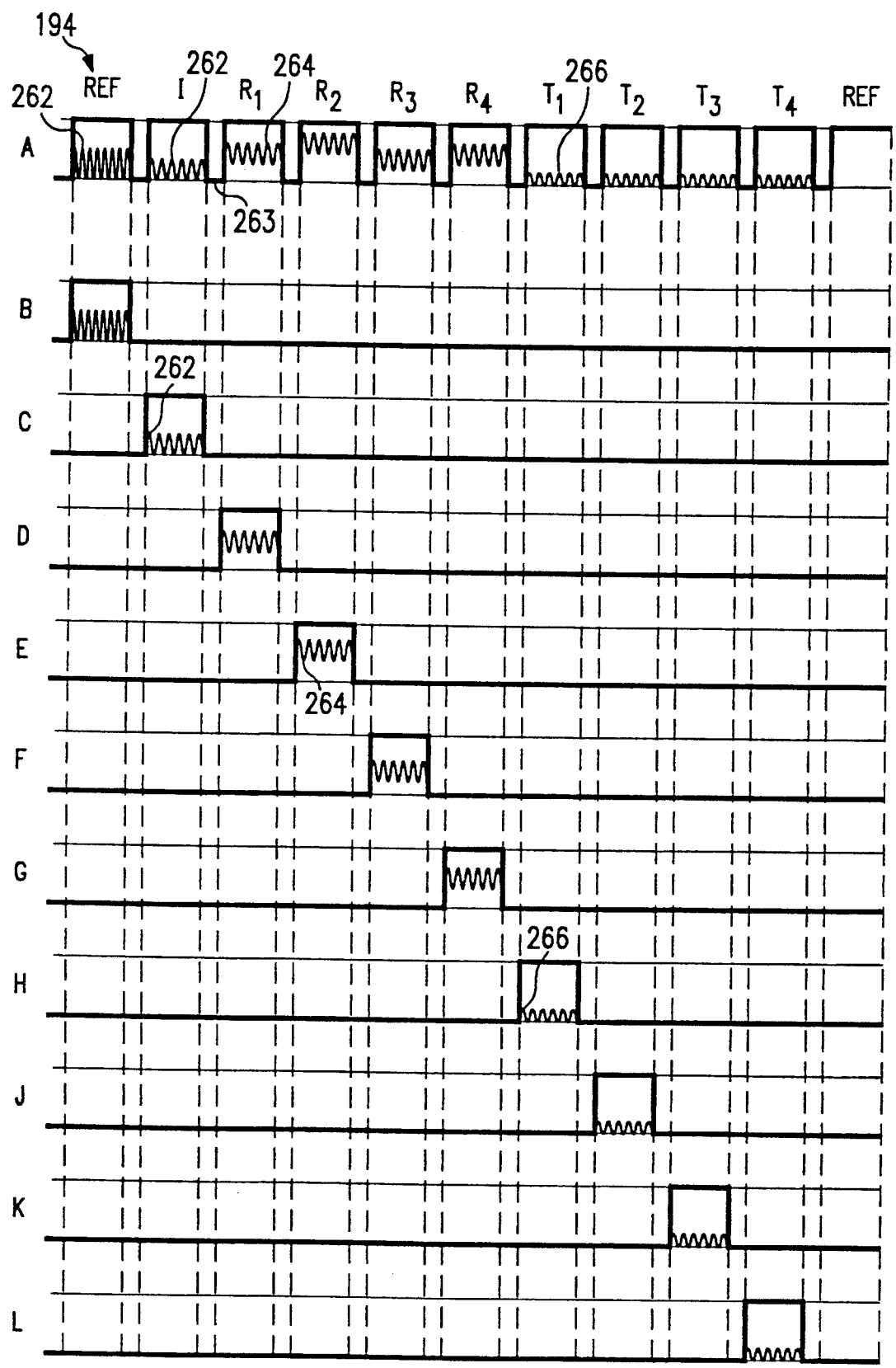
FIG. 11 is a time chart illustrating time-division chopping of s wafer radiance, reflectance, and transmission measurements.

FIG. 11 is a representative time chart illustrating time-division chopping of semiconductor wafer reflectance, transmission and incoherent radiance signals for four-point measurements.

Reference input channel 249 provides a signal that identifies the beginning of chopper wheel 244. As a result, a demultiplexer or other signal identifier may associate with the output from detector 240 to identify the beginning of each cycle of chopper wheel 244, and accordingly identify each output from chopper wheel 244 into detector 240.

For the transmitted fiber-optic terminations, there is a minimal level of radiance collected from semiconductor wafer 22, but there may be a level of transmitted coherent beams 228. In fact, for transmitted terminations 230, the parameter of greater interest is the 5 KHz transmitted laser beam signals. This reading would provide a value for the semiconductor wafer transmittance at the infrared laser wavelength.

FIGS. 12a through 12e illustrate alternative embodiments of fiber-optic bundle 218 of the preferred embodiment. The preferred embodiment uses fiber-optic bundle 218 as described in FIG. 12a. Alternative embodiments, such as those described in FIGS. 12b through 12f, may also be used. Fiber-optic bundle 218 has two primary purposes. The first of which is to direct incident coherent beams to semiconductor wafer 22 and receive reflective coherent beams from wafer 22. The second purpose is to collect the radiated black-body energy that semiconductor wafer 22 generates.

Fiber-optic bundles 218 are designed so that they establish a channel from beam splitter module 204 through optical fiber 214 to the tip of the fiber-optic bundle 218. At the tip of fiber-optic bundle 218 appears a collimating lens 312 to produce a collimated laser beam incident upon the semiconductor wafer 22. Incidence of the coherent laser beam 224 upon semiconductor wafer 22 produces a reflected component and a transmitted component (the transmitted component may be zero depending on various factors).

The infrared laser 202 beam travels through optical fibers 214 to fiber-optic bundles 218 which are positioned within lamp module 139. From fiber-optic bundles 218 the incident coherent beams 224 shine on the semiconductor wafer 22. Some of the light is reflected and some of the light is absorbed by the semiconductor wafer 22. Although it may be desirable to use transmission measurements for numerous embodiments of the present invention, in the preferred embodiment only reflectance is measured. This provides a satisfactory measurement of the semiconductor wafer 22 emissivity, because at the thermal processing temperatures for which the present invention is employed, transmission of semiconductor wafer 22 is usually zero. By measuring the reflected coherent beam and with knowledge of semiconductor wafer surface roughness, it is possible to determine the amount of absorption or emissivity of the semiconductor wafer surface.

Fiber-optic bundles 218 use optical fibers comprising a fluoride compound, however, chalcogenide may also be used. In the preferred embodiment of the present invention, the optical fibers 214 and 228 are of suitable material for the wavelength of infrared laser 202 of approximately 5.4 $\mu$m and may comprise materials such as chalcogenide, fluoride, or silver halide, or other suitably transparent transmitting material for transmitting coherent light energy from beam splitter module 204 to fiber-optic bundles 218. Fiber-optic bundle 218 of FIG. 12a uses a ¼" CaF$_2$ lens 312 with a single laser delivery fiber 214 and several return fibers 227 arrange to terminate in a plane parallel to lens 312.

Fiber-optic cables 214 and 227 in the present invention for both transmission and receipt are preferably multi-mode cables, because multi-mode fibers are easier to align and use for the application of the present invention. Delivery fiber 214 and return fibers 227 are movable to allow control of lens-to-bundle distance. Laser delivery fiber 214 is at the center line of fiber-optic bundle 218 and return fibers 227 are in the surrounding angular region. Lens 312 is anti-reflection coated for optimal transmission at a wavelength of 5.4 $\mu$m.

Transmitted coherent beam terminations 230 include collimating lens (not shown) to focus the transmitted coherent beams 228 into optical fibers 232. The typical beam diameter emitted from infrared laser 82 is 2 to 3 mm. Typically, as incident coherent beam 224 travels to and through semiconductor wafer 22 to become transmitted coherent beam 228, divergence of the laser beam occurs. Although it may change from laser to laser, the divergence of the laser beam passing through semiconductor wafer 22 is approximately 5 milliradians. Thus, as transmitted coherent beam 228 reaches fiber-optic terminal collimating lens, its diameter may approach 4 to 6 mm. The collimating lens focuses the transmitted beam to the fiber-optic core for transmission through fiber-optic cables 232.

Operation of fiber-optic bundle 218 is optimal for both emissivity and temperature measurements. An emissivity measurement involves incident coherent beam 232 emitting from the tip of delivery fiber 214 with a known half-cone angle of divergence (approximately 11°). Lens 312 realigns incident coherent beam 224, depending on the relative position of the optical fiber 214 tip to lens 312. Incident coherent beams 224 leaving lens 312 arrive at semiconductor wafer 22. A portion of incident coherent beam 224 is reflected as reflected coherent beam 226 which passes back through lens 312 and is projected onto bundle tip 218.

The approximation of semiconductor wafer 22 as a partial specular reflector for reflected coherent beam 226 is acceptable at the wavelength of light considered in the present invention (i.e., 5.4 $\mu$m). The dimensions of the projected reflected image of delivery fiber 214 depends on the relative distance between the tip of optical fiber 214 and lens 312. This distance can be tuned to maximize the amount of reflected coherent beam 226 that projects onto return fibers 227 instead of projecting onto delivery fiber 214 and not being collected.

Figure 12A:
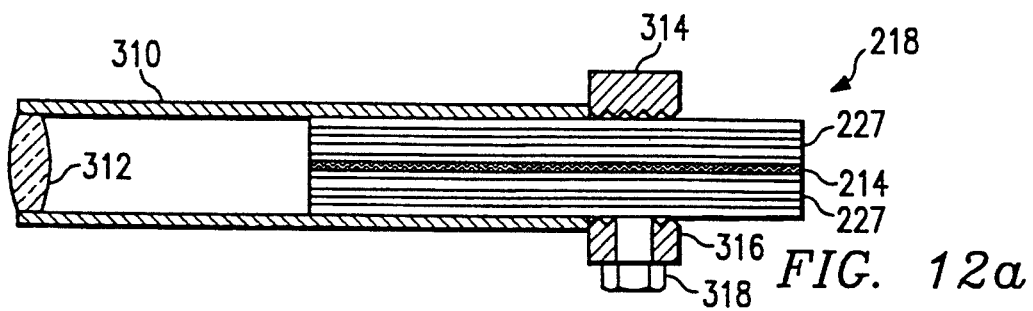

The bundle-to-lens distance has to be optimal to provide an acceptable level of light collected both by reflection and emission from semiconductor wafer 12. A basic limitation of the design of FIG. 12a is that the return fibers 227 will collect not only the reflected coherent beam and emitted radiant energy from the semiconductor wafer, but also some fraction of incident coherent beam will be reflected from lens 312 back to return fibers 227 as well as reflected from the optical window 106 separating the atmospheric ambient from the vacuum inside the process chamber. Although window reflection may be essentially eliminated by tilting optical window 106 at an appropriate angle to the incidental light direction, the lens reflection is not easily eliminated. To overcome the limitation, the preferred embodiment utilizes a lens coating on lens 312 with an anti-reflection (AR) coating specific to the wavelength of infrared laser 202.

Figure 12B:
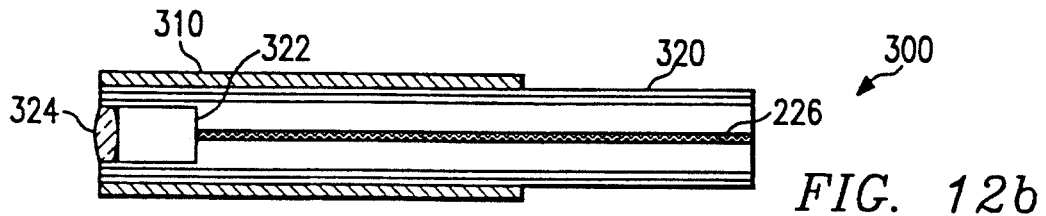

The fiber-optic bundle design of FIG. 12b is similar to that of 12a, except that lens 324 is smaller and serves as only a delivery path for delivery fibers 320. The light path from semiconductor wafer 22 to return fibers 227, therefore, does not pass through lens 324. The design of fiber bundle 300 of FIG. 12b eliminates the direct reflection of lens 324, but also causes a large area of the bundle at the critical collection location to be unavailable for collection of reflected laser or emitted wafer light. This is because lens 324 must be significantly larger than the essential fiber diameter for proper collimation of incident laser beam 224.

Figure 12C:
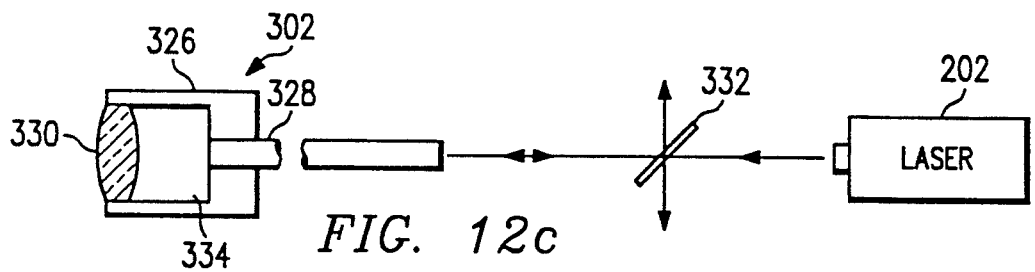

FIG. 12c provides yet another embodiment of fiber-optic bundle 302 that uses a single large diameter fiber 328 to both deliver incident coherent beams and collect reflected coherent beam and emitted wafer radiant energy. In the fiber-optic bundle 302 of FIG. 12c, reflected coherent beam 226 and emitted light 222 can be separated from incident coherent beam 224 using either a beam splitter or a Brewster window arrangement. The design of FIG. 12c provides for collection of almost all of the reflected/emitted light focus by the lens, because the fiber can be made sufficiently large to accommodate a significant collection area. The collection area 334 is available for both incident and return beam transmission. A disadvantage of the design of FIG. 12c, however, involves the direct reflection of incident coherent beam 224, not only at the lens surface but also at the entrance and exit from the fiber. Because the measured reflected power from semiconductor wafer 22 can be less than 50% of the incident power, this design may increase background reflection to an unacceptable level.

Figure 12D:
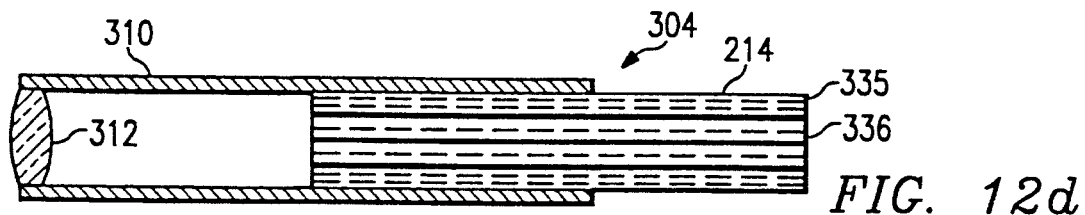
Figure 12E:
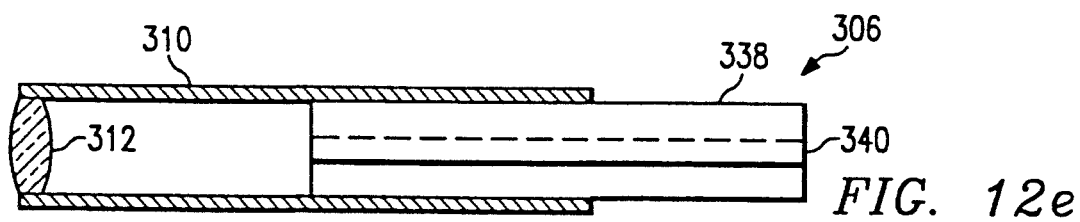

The designs of FIGS. 12d and 12e may also be used as alternative embodiments of the fiber-optic bundle. FIG. 12d shows a randomized array of delivery fibers 214 and return fibers 336 at the bundle 304. The arrangement of FIG. 12d permits the system to be easier to align, but suffers from the limitations of it not being clear what power level can be driven into the laser bundle at the laser entry point. With fiber-optic bundle 304, a significant portion of the beam power will be absorbed by epoxy surrounding the fiber-optic cable and this may cause damage.

On the other hand, the configuration of FIG. 12e involves a single light delivery fiber 340 and a single return fiber 338. The two fibers are arranged at the sample tip, behind lens 312, such that the laser light leaves the first fiber 340, goes through lens 312, and reflects at semiconductor wafer 22. The beam is then refocused at the second fiber. The light emitted from semiconductor wafer 22 is also collected by return fiber 338. The limitation associated with the FIG. 12e configuration is a critical dependance on precision alignment.

Figure 13:
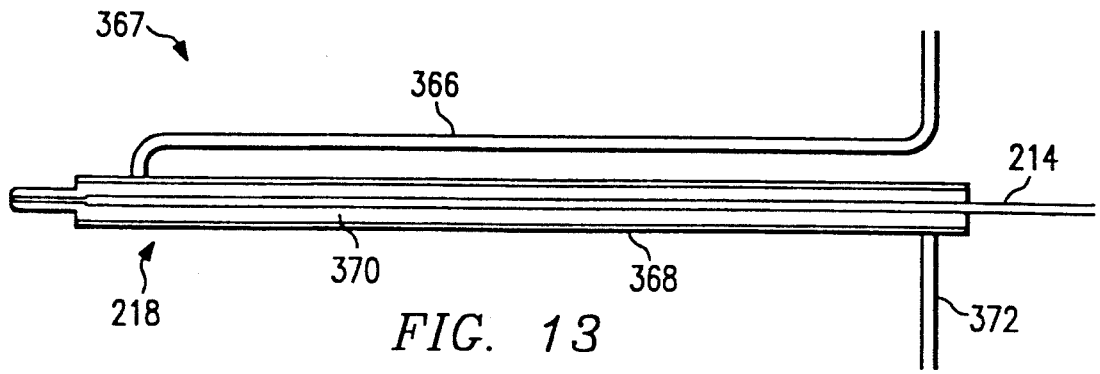
FIG. 13 is side diagrammatic view of a cooling jacket for the fiber-optic bundles used in a preferred embodiment of the present invention.

FIG. 13 is a cut-away side diagrammatic view of a cooling jacket 367 used to maintain a low temperature at fiber-optic bundle 218 in the preferred embodiment. Fiber-optic bundle 218 appears within sheath 368 which serves as a water cooling shroud. Sheath 368 contains inlet 366 and outlet 372. As fiber-optic bundle 218 increases in temperature as result of its proximity to lamp module 134, it is important to maintain a constant and-/or temperature in fiber-optic bundles 218. However, in order to prohibit heat from lamp module 134 from adversely affecting the transmission of coherent energy to and from fiber-optic bundles 218, cooling water 370 may be passed through inlet 366 into sheath 368 and then exit the outlet 372. As water circulates through sheath 368, it removes heat that lamp module 134 generates.

Figure 14:
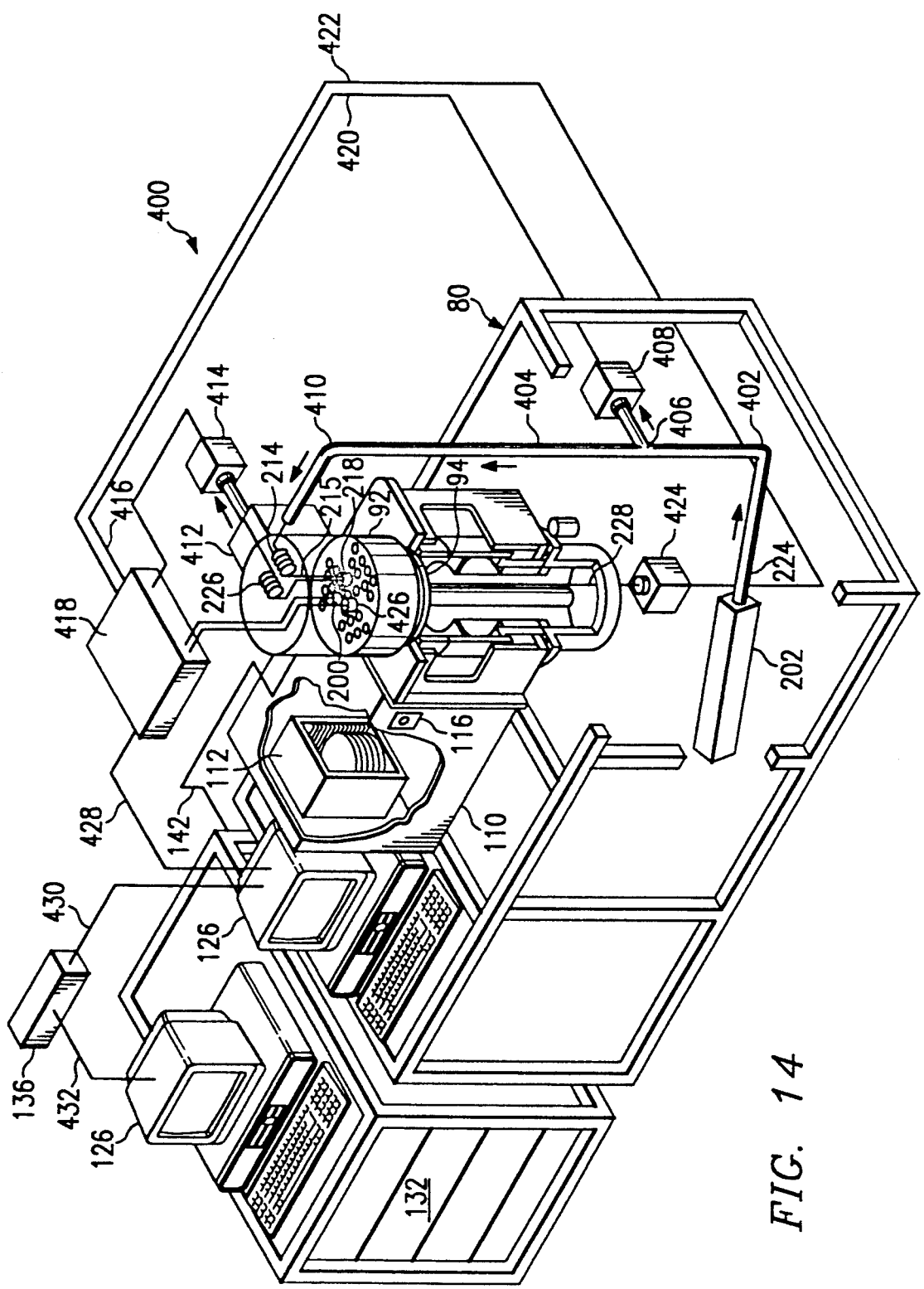
FIG. 14 is a partially cut-away perspective view of the present invention integrated with the process control computer for the purpose of real-time semiconductor wafer fabrication process control.
Figure 15:
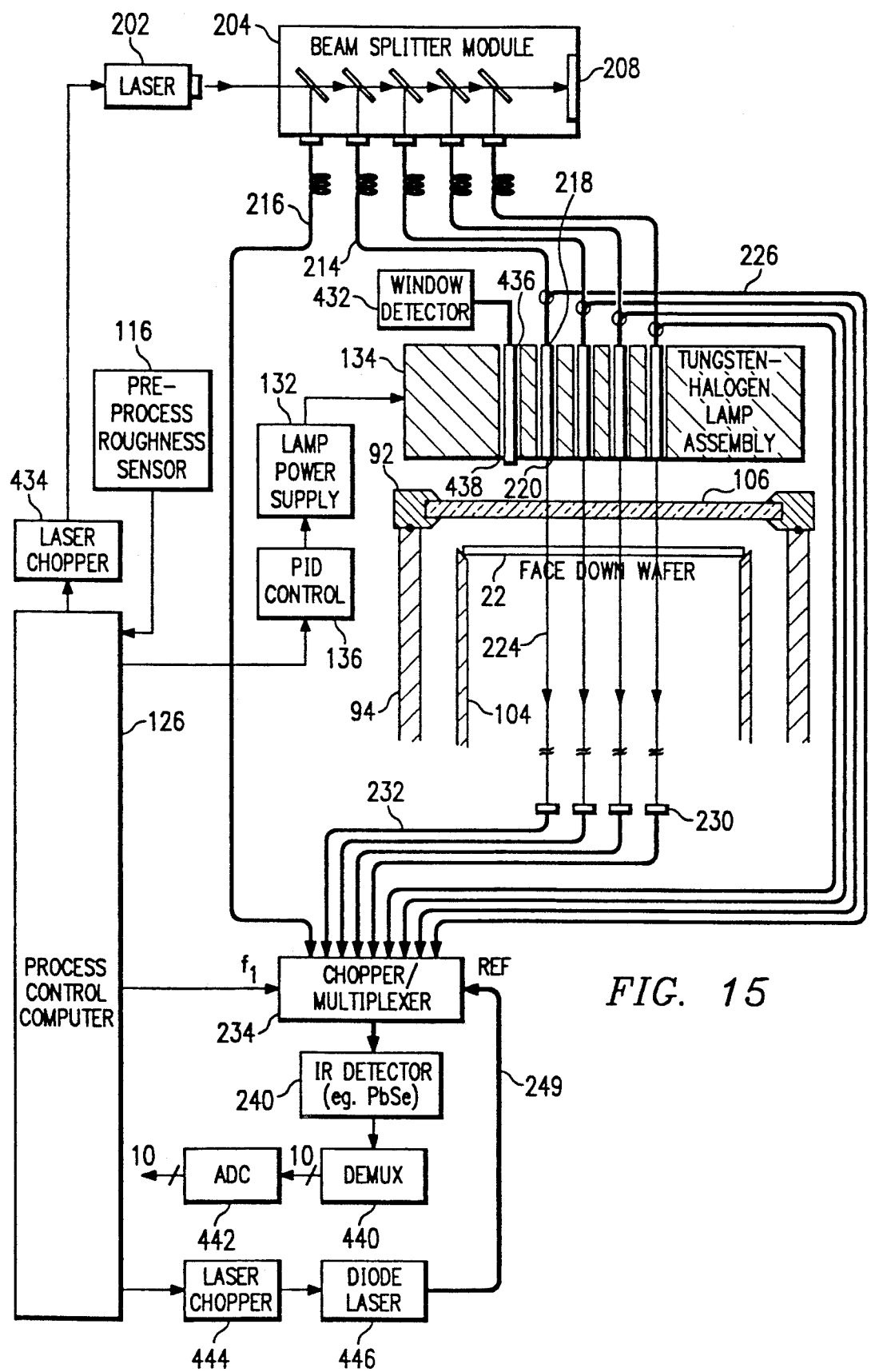
FIG. 15 is a schematic block diagram of the integrated sensor system of FIG. 14.

FIG. 14 is a partially cut-away perspective view of the present invention integrated with the process control computer of a rapid thermal processing system for the purpose of real-time semiconductor wafer fabrication process control. FIG. 15 is a schematic block diagram of the integrated system of FIG. 14. The output from detector 240 goes to demultiplexer 440. Demultiplexer 440 is programmed to recognize the origin of the signal from detector 240 based on the reference signal from semiconductor diode laser 446. Demultiplexer 440 produces a signal on each line (total of 10 lines for this example) emanating from demultiplexer 440 and associated with each input fiber-optic cable that leads into fiber-optic adapter module 234. Output from demultiplexer 440 comprises analog electrical signals having a current or voltage level representative of various power channels received by detector 240. These analog signals are converted to digital signals at analog-to-digital converter 442.

Output from analog-to-digital converter 442 goes to process control computer 126. Process control computer 126 operates on digital input from analog-to-digital converter 442 to further process the digital signals. Process control computer 126 digitally filters each of the digital inputs to separate the AC and DC components of the received signals, respectively representing the reflected coherent beam and radiance emitted from semiconductor wafer 22. Additionally, process control computer 126 can determine reflectance and transmittance using the reflected and transmitted beam power levels to determine semiconductor reflectance and transmittance. With these values, process control computer 126 can determine semiconductor wafer 22 emissivity.

Having determined semiconductor reflectance, transmittance, radiance, and emissivity, process control computer 126 executes an algorithm to determine the true semiconductor wafer 22 temperature in real-time. The temperature values that process control computer 126 determines are true temperatures for each of the probe points associated with fiber-optic bundles 218.

Process control computer 126 may store, among other values, surface roughness for the particular semiconductor wafer being examined by the sensor of the present invention. U.S. patent Ser. No. 07/638,468, filed Dec. 31, 1990 entitled "Method and Apparatus for Semiconductor Wafer Processing Diagnosis and Prognosis" by Dr. Moslehi, now U.S. Pat. No. 5,270,222 issued Dec. 14, 1993, discloses a fiber-optic scatter module or pre-process roughness sensor 116 for determining surface roughness of semiconductor wafer 22. The characteristics of that patent application are herein incorporated by reference and made part of this application. In-situ measurement data from the scatter module 116 of that application may be stored in process control computer 126 and used as part of the data necessary for accurate temperature measurement in the present invention. Thus, in real time with each sampling of a fiber-optic bundle 218 (i.e., during the period 1/f1) process control computer 126 will provide a true temperature measurement for the point on semiconductor wafer 22 associated with its respective fiber-optic bundle 218. In the preferred embodiment, these updates occur at every 20 to 200 millisecond interval.

Actual emissivity of semiconductor wafer 22 may be taken by first obtaining a value for the surface roughness of a semiconductor wafer such as by using the scatter, module 116 described in aforementioned U.S. Pat. Ser. No. 07/638,468. The invention of that disclosure provides a value for both coherent reflectance and scatter reflectance produced by the surface roughness of the semiconductor wafer. Therefore if in the process chamber the coherent reflectance of the semiconductor wafer can be measured using the sensor of the present invention, the relative proportions of coherent reflected energy and scatter reflected energy obtained by scatter module 116 may be used to determine a real-time measurement for scatter reflection and total reflectance of semiconductor wafer for the incident coherent beams from fiber-optic bundles 218.

Process control computer 126 time averages the reflectance and transmittance values over numerous to yield reliable time-averaged semiconductor wafer 22 reflectance and transmittance values during the semiconductor wafer 22 fabrication process. This produces time-averaged and noise-free reflectance, transmittance and emissivity values for the semiconductor wafer. It is updated approximately every 20 to 200 milliseconds. This updating rate falls within the required rate of lamp central to accurately control a semiconductor wafer fabrication process.

With measured values for coherent reflectance and surface roughness of semiconductor wafer 22, it is possible to determine the total reflectance of the semiconductor wafer, and likewise the total transmittance for the semiconductor wafer in real time. The total reflectance and total transmittance values lead directly to emissivity values for the semiconductor wafer in real-time. Process control computer 126 can be utilized to make these calculations at the wavelength of infrared laser 202 and in real time.

The measured signals received and manipulated by the process control computer 126 may be compared to predetermined desired setpoints for semiconductor wafer 22 temperature within the fabrication reactor. For example, assume a semiconductor wafer fabrication process is to occur at 800° C. The sensor 200 utilizes fiber-optic bundles 218 and terminations 230 to make measurements at four separate points on semiconductor wafer 22. These measurements are used along with a real-time multi-zone controller to achieve the desired wafer temperature and to optimize process uniformity. By associating a multi-zone lamp module 134 with at least one fiber-optic bundle, it is possible to provide, through process control computer 126, a feedback network that senses local temperature at the sensing point at, for example, fiber-optic bundle 218 to determine, in real time, whether the temperature of semiconductor wafer 22 at that point satisfies the desired setpoint value. In the event the setpoint value is not satisfied, the real-time PID controller will adjust the multi-zone lamp 134 power to cause semiconductor wafer to approach the desired temperature of 800°, in the example.

The sensor 200 of the preferred embodiment has numerous applications and can be used in numerous configurations of semiconductor wafer processing equipment. It allows real-time semiconductor wafer temperature measurements and real-time adaptive uniformity control of semiconductor fabrication processes. No known systems for the semiconductor wafer temperature measurement can provide this type of real-time temperature and uniformity control capability.

Figure 16:
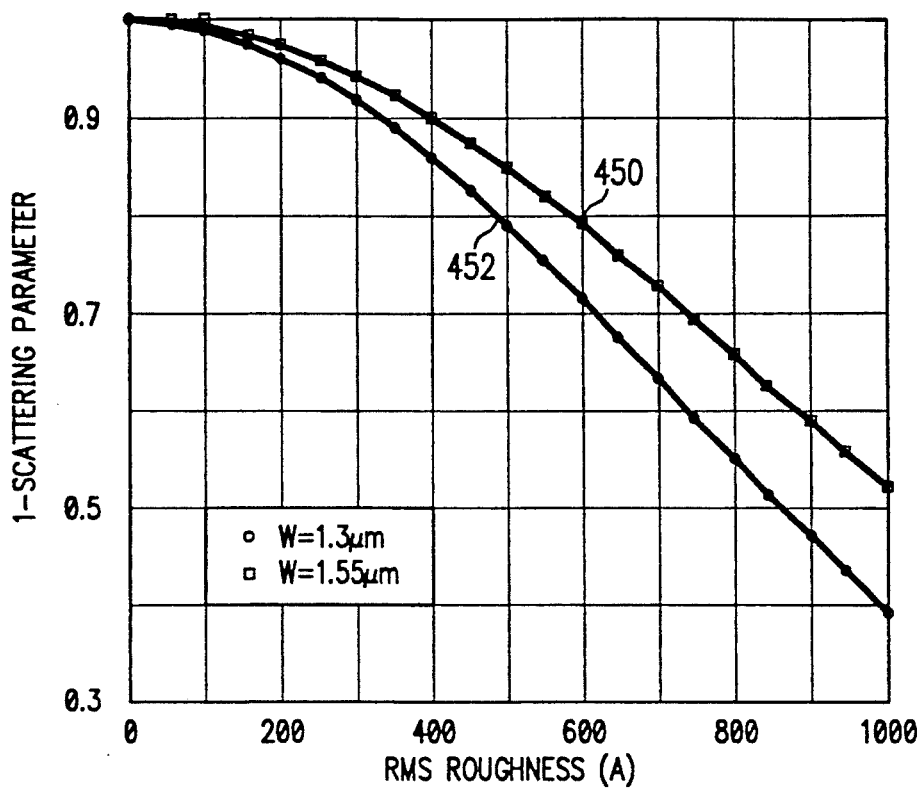
FIG. 16 is a plot of the parameter, $1-S_r$, versus semiconductor wafer RMS surface roughness ($S_r$ is the scattering parameter)

FIG. 16 illustrates an important relationship that exists between RMS surface roughness and scattering parameter of a coherent laser beam incident upon the semiconductor wafer surface. It can be shown that the scatter reflective power $P_{sr}$ and coherent reflected power $P_{cr}$ of a reflected laser beam varies as a function of a ratio of the RMS surface roughness of the semiconductor wafer and the wavelength of the incident coherent beam. The scattering parameter $S_r$ is defined by the following equation:

$$S_r = \frac{P_{sr}}{(P_{sr} + P_{cr})} \qquad (4)$$

For given wavelength, W and scattering parameter, $S_r$, it is possible to determine the RMS surface roughness (for example, for wafer backsides).

FIG. 16 provides a calculated plot of this relationship for a laser wavelength W, of 1.3 μm and a laser wavelength of 1.55 μm. Along the ordinate of FIG. 16 and ranging from 0.3 to 1.0 are values for the quantity 1-$S_r$. Along the abscissa are the values of the dependent variable, RMS surface roughness, ranging from 0 to 1,000 Å. An example of the use of FIG. 16 is as follows. Take, for example, the curve associated with the laser beam having a wavelength of 1.3 μm and a value of the scattering parameter 1-$S_r$, of 0.79. The plot of FIG. 16 provides an RMS roughness value of 500 Å indicated at point 452. Likewise, with the laser beam wavelength of 1.55 μm, the same scattering parameter value 0.79 provides an RMS roughness value of 600 Å at point 450.

The calculated chart of FIG. 16 shows that as the RMS roughness increases from zero to 1000 Å, the scattering parameter $S_r$ increases. This causes $1-S_r$ to decrease to zero.

Figure 17:
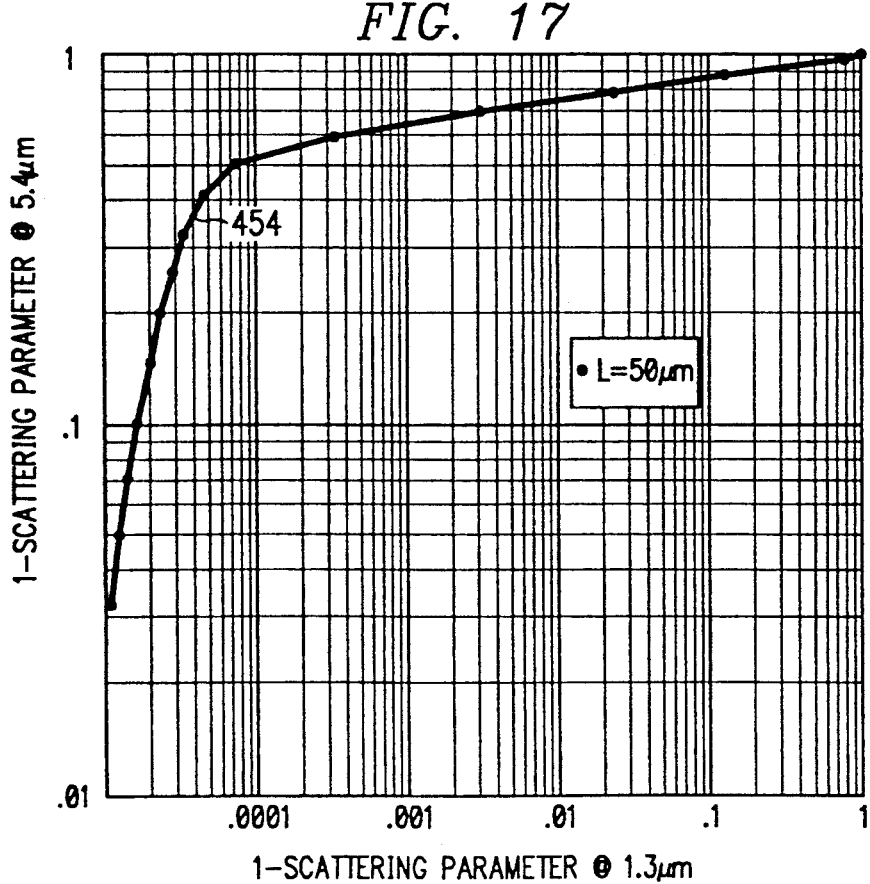
FIG. 17 is a diagram of calibration data relating the parameter, $1-S_r$, obtained at a laser wavelength of 1.3 μm to scattering data at a wavelength of 5.4 μm.

FIG. 17 is a diagram of calibration data relating the parameter, $1-S_r$, obtained at a laser frequency of 1.3 μm to appropriate data at a laser wavelength of 5.4 μm. It can be shown that semiconductor wafer surface roughness does not change considerably with changes in wafer temperature. As a result, a measurement of incident coherent beam scattering at room temperature can, with minimal loss of accuracy, be taken as a measurement of semiconductor wafer scattering at the process temperature. The scatter module 116 of aforementioned U.S. patent application Ser. No. 07/638,468 measures incident beam coherent scattering at 1.3 μm. Infrared laser 202 produces an incident coherent beam having a 5.4 μm wavelength. The calculated plot of FIG. 17 relates surface scattering at 1.3 μm to beam scattering at 5.4 μm to provide an input value for scattering parameter for process control computer 126 of the present invention.

Figure 18:
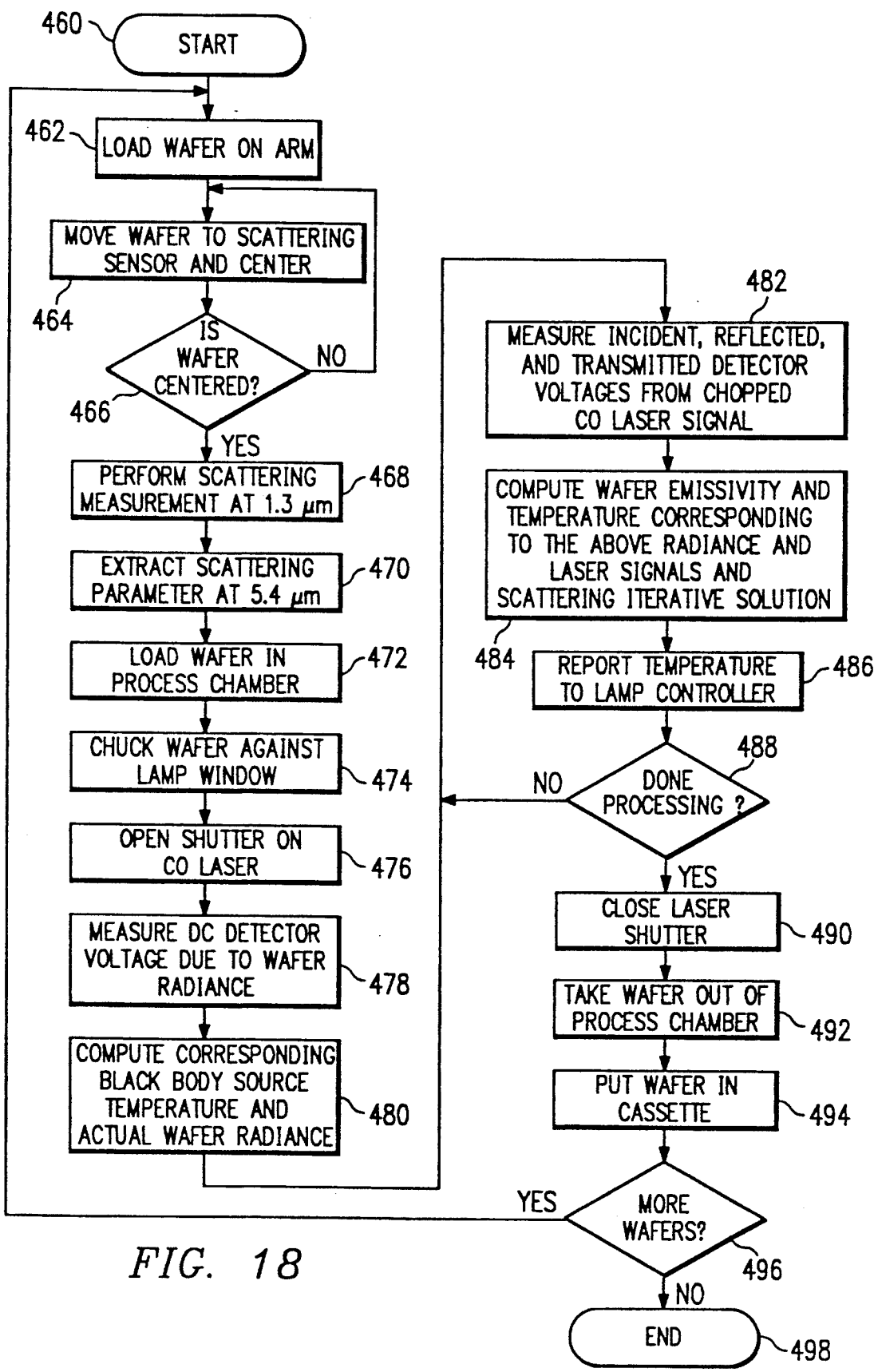
FIG. 18 is a flow chart illustrating use of the integrated sensor system incorporating the preferred embodiment of the present invention together with a process control computer for real-time semiconductor wafer temperature measurement and fabrication process control.

FIG. 18 is a flow chart illustrating use of the integrated system incorporating the preferred embodiment of the present invention together with a process control computer for real-time semiconductor wafer fabrication process control. The process begins at the start position of 460. Once the process is started, the first step is to load a semiconductor wafer on the arm of the wafer handling robot at 462. Next, the wafer handling robot will move the semiconductor wafer to the scattering sensor and center the wafer at the scattering sensor at 464. The next step is to query whether the wafer is centered properly at the scattering center at 466. If the wafer is properly centered, then the process continues to the next step 468. Otherwise, the program returns to step 464 to move the wafer to the center of scattering module 116 (corresponding to optimum gap and tilt values).

The next step 468 in the process is to perform scattering measurements at 1.3 μm. Next, using the Table of FIG. 18, process control computer 126 extracts a scattering parameter at 5.4 μm at step 470. The next step 472 is to load the wafer in the process chamber. The next step is to place the semiconductor wafer against the lamp window at 474, and open the shutter to the CO laser 202 at step 476. The next step in the process is to measure the DC detector voltage due to the wafer radiance at step 478. The process continues and computes the corresponding black body source temperature at actual radiance at step 480. Using the infrared detector and process control computer of the present invention, the next step is to measure the incident, reflected, and transmitted detector voltages from the chopped CO laser signal at step 482.

The next step is to compute wafer emissivity and temperature corresponding to the above radiance and laser signals in scattering into solution at step 484. Once this is done, the next step 486 is to report the temperature to lamp controller portion of process computer 126. Then the program queries whether wafer processing is done at 488. If not, the program returns to step 482 and proceeds to measure incident, reflected, transmitted detector voltages from chopped CO laser signals. This process will continue to the "done processing"? query at 488 until in fact processing is finished. Once processing is done the process entails sending a signal to close the laser shutter at 490. The next step is to take the wafer out of process chamber 38 using wafer handling robot at step 492, and put semiconductor wafer 22 in its handling cassette at step 494. If more wafers are to be processed then, in response to the query at 496, program control returns to step 462 where yet another wafer is loaded on robot. Otherwise, the algorithm ends at step 498 and processing is complete.

Although the present invention and its advantages have been described in detail, it should be understood that various changes, substitutions and alterations can be made herein without departing from the spirit and scope of the invention as defined by the appended claims.

What is claimed is:

1. A fiber-optic network for communicating multi-point, non-invasive, in-situ, pyrometry-based, emissivity-compensated temperature measurements of a semiconductor wafer in a fabrication reactor, comprising:
 a plurality of optical fibers for transmitting electromagnetic energy, said optical fibers comprising a set of incident beam optical fibers and a set of received beam optical fibers; and
 a fiber-optic bundle associated with each said optical fiber to receive said optical fibers, each of said bundles associated with the incident beam optical fibers for directing a plurality of incident beams to the semiconductor wafer, and each of said bundles associated with the set of received beam optical fibers for receiving a plurality of reflected beams and a plurality of radiant heat energy signals from the semiconductor wafer.

2. The apparatus of claim 1 further comprising a multiplexer for combining said plurality of reflected beams and said plurality of radiant heat energy signals into a single time-division multiplexed output signal.

3. The apparatus of claim 1, wherein said fiber-optic bundle comprises a bundle jacket for providing structural support.

4. The apparatus of claim 1, wherein said fiber-optic bundle further comprises a collimating lens for collimating said incident beam.

5. The apparatus of claim 1, wherein said fiber-optic bundles are sufficiently small to fit within light pipe holes in a lamp module that directs optical heating energy to the semiconductor wafer.

6. The apparatus of claim 1, wherein the fabrication reactor comprises a lamp module for transmitting optical heating energy and said fiber-optic bundle sends said incident coherent beams and receives said reflected coherent beams and said radiant heat energy along paths essentially perpendicular to the semiconductor wafer surface.

7. The apparatus of claim 1, wherein said optical fibers transmit beams of infrared electromagnetic energy.

8. The apparatus of claim 6, wherein said infrared electromagnetic energy beam comprises a laser beam having a wavelength of approximately 5.4 microns.

9. The apparatus of claim 6, wherein said infrared electromagnetic energy beam comprises a chopped beam of electromagnetic energy.

10. The apparatus of claim 5, wherein said chopped beam has a chopping frequency that relates to the rates of real-time emissivity and temperature measurements.

11. The apparatus of claim 1, further comprising a circuitry for associating each of said plurality of incident coherent beams with the corresponding reflected coherent beam to yield a beam pair, and further associating each beam pair with the radiant heat energy collected from the point of incidence and reflection from the semiconductor wafer to yield a single temperature value for each respective probed point of the semiconductor wafer.

12. The apparatus in claim 1, wherein the semiconductor wafer resides within a semiconductor wafer fabrication reactor having a lamp module for heating the semiconductor wafer and wherein said incident coherent beam collecting circuitry and said reflected coherent beam and radiant heat energy collecting circuitry operate in realtime as said lamp module heats the semiconductor wafer.

13. The apparatus of claim 1, wherein the semiconductor wafer resides within a semiconductor wafer fabrication reactor comprising a multi-zone lamp module, said multi-zone lamp module comprising a plurality of controllable lamp heating zones and further comprising circuitry for uniformly heating the semiconductor wafer.

14. The apparatus of claim 12, further comprising circuitry for associating each of said fiber-optic bundles with at least one of said controllable lamp heating zones and controlling said lamp heating zones in response to said associated measured temperature values.

15. The apparatus of claim 1, further comprising a Brewster window associated with said fiber-optic bundle for permitting bi-directional flow of electromagnetic energy beams within optical fibers associated with said fiber-optic bundles.

16. The apparatus of claim 2, wherein said multiplexer comprises a fiber adapter module for receiving a plurality of optical fibers.

17. The apparatus of claim 16, wherein said multiplexer further comprises a chopper wheel for sequentially controlling the time-division multiplexing of output signals.

18. A method for communicating, pyrometry-based, emissivity-compensated temperature measurements of a semiconductor wafer in a fabrication reactor, comprising:

transmitting electromagnetic energy over a plurality of optical fibers, said optical fibers comprising a set of incident beam optical fibers and a set of received beam optical fibers;

directing a plurality of incident beams to the semiconductor wafer using a plurality of optic fiber bundles, each of said bundles being associated with one of the set of incident beam optical fibers and receiving a plurality of reflected beams and a plurality of radiant heat energy signals from the semiconductor wafer using a plurality of fiber optic bundles, each of said plurality being associated with one of the set of received beam fibers; and combining said plurality of reflected beams and said plurality of radiant heat energy signals into shared output signal channels using a time-division multiplexer.

19. The method of claim 18, further comprising the step of encasing said fiber-optic bundles within bundle jackets for providing structural support and insulating said fiber-optic bundles.

20. The method of claim 18, wherein said directing step further comprises the step of collimating said incident coherent beams.

21. The method of claim 18, further comprising the step of placing said fiber-optic bundles within a lamp module that directs optical heating energy to the semiconductor wafer.

22. The method of claim 18, wherein the fabrication reactor comprises a lamp module for transmitting optical heating energy and said directing and receiving steps take place along paths essentially perpendicular to the semiconductor wafer surface.

23. The method of claim 18, wherein said optical fibers transmit beams of infrared electromagnetic energy.

24. The method of claim 23, wherein said infrared electromagnetic energy beam comprises a laser beam having a wavelength of approximately 5.4 microns.

25. The method of claim 23, wherein said infrared electromagnetic energy beam comprises a chopped beam of electromagnetic energy.

26. The method of claim 25, wherein said chopped beam has a chopping frequency that relates to the rates of real-time emissivity and temperature measurements.

27. The method of claim 18, further comprising the step of associating each of said plurality of incident beams with the reflected beam to yield a beam pair, and further associating each beam pair with the radiant heat energy collected from the point of incidence and reflection from the semiconductor wafer to yield a temperature value for each respective point of the semiconductor wafer.

28. The method in claim 18, wherein the semiconductor wafer resides within a semiconductor wafer fabrication reactor having a lamp module for heating the semiconductor wafer and wherein said incident coherent beam collecting circuitry and said reflected coherent beam and radiant heat energy collecting steps take place in real-time as said lamp module heats the semiconductor wafer.

29. The method of claim 18, wherein the semiconductor wafer resides within a semiconductor wafer fabrication reactor comprising a multi-zone lamp module, said zone multi-zone lamp module comprising a plurality of controllable lamp heating zones, and further comprising the step of uniformly heating the semiconductor wafer.

30. The method of claim 29, further comprising the step of associating each of said fiber-optic bundles with at least one of said independently controllable point source heat lamps, and controlling said point heat lamps in response to said associated measured temperature values.

31. The method of claim 18, further comprising the step of associating a Brewster window with said fiber-optic bundle for permitting bi-directional flow of electromagnetic energy beams within optical fibers associated with said fiber-optic bundles.

32. The method of claim 18, wherein said multiplexer comprises a fiber adapter module for receiving a plurality of optic fiber bundle.

33. The method of claim 32, wherein said multiplexer further comprises a chopper wheel for sequentially controlling the time-division multiplexing of output signals.

* * * * *